(12) United States Patent
Mühlebach et al.

(10) Patent No.: US 6,936,656 B2
(45) Date of Patent: Aug. 30, 2005

(54) COMB POLYMERS FROM ATRP MACROMONOMERS

(75) Inventors: Andreas Mühlebach, Frick (CH); François Rime, Delémont (CH); Clemens Auschra, Freiburg (DE); Ernst Eckstein, Rheinfelden (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 318 days.

(21) Appl. No.: 10/169,884

(22) PCT Filed: Jan. 4, 2001

(86) PCT No.: PCT/EP01/00053

§ 371 (c)(1),
(2), (4) Date: Jul. 10, 2002

(87) PCT Pub. No.: WO01/51534

PCT Pub. Date: Jul. 19, 2001

(65) Prior Publication Data

US 2003/0166755 A1 Sep. 4, 2003

(30) Foreign Application Priority Data

Jan. 11, 2000 (EP) .............................................. 00810023

(51) Int. Cl.⁷ .............................................. C08F 293/00
(52) U.S. Cl. ....................... 524/560; 523/334; 523/335; 524/558; 524/566
(58) Field of Search ................................ 524/560, 558, 524/566; 523/334, 335

(56) References Cited

U.S. PATENT DOCUMENTS

| | | | |
|---|---|---|---|
| 5,109,075 A | 4/1992 | Yu | .............................. 525/404 |
| 5,789,487 A | 8/1998 | Matyjaszewski et al. | ... 525/301 |
| 5,807,937 A | 9/1998 | Matyjaszewski et al. | ... 526/135 |
| 5,824,733 A | * 10/1998 | Dobert et al. | ................ 524/506 |
| 6,462,125 B1 | * 10/2002 | White et al. | ................. 524/560 |

FOREIGN PATENT DOCUMENTS

| | | |
|---|---|---|
| EP | 0218436 | 4/1987 |
| EP | 0911350 | 4/1999 |
| WO | 99/03938 | 1/1999 |
| WO | 99/43719 | 9/1999 |
| WO | 00/11055 | 3/2000 |
| WO | 00/18807 | 4/2000 |
| WO | 00/40630 | 7/2000 |

OTHER PUBLICATIONS

Derwent Abstract 1999–256390 [71] for EP 911350 (1999).

* cited by examiner

Primary Examiner—David W. Wu
Assistant Examiner—Satya Sastri
(74) Attorney, Agent, or Firm—Tyler A. Stevenson; Kevin T. Mansfield

(57) ABSTRACT

The invention relates to comb polymers and macromonomers based on acrylates prepared by the ATRP (Atom Transfer Radical Polymerization) method. These polymers have an improved capability of dispersing pigments in the given solvent. The invention also relates to compositions comprising the comb polymers and macromonomers dispersible inorganic or organic pigment particles. The compositions are used by applying them to any suitable substrate, for example to metal, wood plastic or ceramic materials.

18 Claims, No Drawings

COMB POLYMERS FROM ATRP MACROMONOMERS

The present invention relates to comb copolymers, a composition containing the comb copolymers and dispersible pigment particles, a macromonomer consisting of ATRP polymers, a composition comprising the macromonomers and curing agents and a process for preparing the macromonomers by ATRP methods.

The present invention specifically relates to a pigment composition containing comb polymers prepared from ATRP (Atom Transfer Radical Polymerisation) macromonomers, to a pigment dispersion prepared from the pigment composition and to the macromonomers which are characterised by a low polydispersity range, preferably a polydispersity range which is lower than 3, an enhanced monomer to polymer conversion efficiency and predetermined molecular weights.

Dispersions containing pigments and polymer additives are used in an almost unlimited number of different technical applications, e.g. as coating materials, printing inks, for colouring plastic materials, including fibers, glasses, or ceramic products, for formulations in cosmetics, or for the preparation of paint systems, in particular automotive paints and dispersion colours.

The function of polymers in pigment dispersions is manifold. They may act as solubilisers in the given dispersing agent, e.g. water or organic solvents. Suitable polymers are also needed as stabilisers to prevent precipitation or flocculation. Polymers may also improve the gloss of the pigment dispersion or enhance its rheology. Depending on the type and polarity of the dispersing agent, e.g. water, organic solvents or mixtures thereof, polymers of variable structure are chosen. In view of ecological requirements, the use of aqueous pigment dispersions is particularly preferred.

Dispersions containing pigments and polymer additives are used in an almost unlimited number of different technical applications, e.g. as coating materials, printing inks, for colouring plastic materials, including fibers, glasses, or ceramic products, for formulations in cosmetics, or for the preparation of paint systems, in particular automotive paints and dispersion colours.

Many different well established methods are available for preparing polymers. Group transfer polymerisation (GTP) is a method for producing A-B block copolymers of defined structure from acrylate monomers. With a hydrophilic "B" block (neutralised acid or amine containing polymers), these polymers are useful for preparing water based pigment dispersions. The hydrophobic "A" blocks (homo- or copolymers of methacrylate monomers) are surface active and associate with either pigment or emulsion polymer surfaces, cf. H. J. Spinelli, *Progress in Organic Coatings* 27 (1996), 255–260.

Despite its wide applicability and usefulness the GTP method still has several drawbacks. The hydrophilic/hydrophobic "balance" is obtained by copolymerising a limited group of specific acrylate and methacrylate monomers. Moreover, the polymerisation initiators used in this method, such as the silyl ketene acetals disclosed in U.S. Pat. No. 4,656,226, e.g. 1-trimethyl-silyloxy-1-isobutoxy-2-methylpropene, are highly reactive and difficult to prepare in a multi-step synthesis. This necessitates the use of carefully dried and purified reactants, which limits this method in industrial applications.

U.S. Pat. No. 4,581,429 discloses a free radical polymerisation process by controlled or "living" growth of polymer chains which produces defined oligomeric homopolymers and copolymers, including block and graft copolymers. A process embodiment is the use of initiators of the partial formula R'R"N—O—X. In the polymerisation process the free radical species R'R"N—O. and .X are generated. .X is a free radical group, e.g. a tert.-butyl or cyanoisopropyl radical, capable of polymerising monomer units containing ethylene groups. The monomer units A are substituted by the initiator fragments R'R'R"N—O. and .X and polymerise to structures of the type: R'R"N—O—A—X (A: polymer block). Specific R'R"N—O—X Initiators mentioned are derived from cyclic structures, such as 2,2,6,6-tetramethylpiperidine, or open chain molecules, such as di-tert.-butylamine.

An improvement of this method is described in WO 96/30421 which discloses a controlled or "living" polymerisation process of ethylenically unsaturated polymers, such as styrene or (meth)acrylates, by employing the ATRP method. According to this method initiators are employed which generate a radical atom such as .Cl, in the presence of a redox system of transition metals of different oxidation states, e.g. Cu(I) and Cu(II), providing "living" or controlled radical polymerisation.

The drawback of these and any other methods of the prior art for preparing polymers of defined structure is the fact that the polymers consist of linear molecular chains. Structural variations of these chains have the effect that the difference in polarity between the copolymer blocks of predominantly hydrophobic and predominantly hydrophilic character is only gradual. Therefore, these copolymers only have a limited capability of dispersing pigments in pigment dispersions, especially aqueous pigment dispersions.

The problem to which the present invention relates is the need for a greater choice of synthetic possibilities to prepare polymers of higher capability of dispersing pigments in the given solvent. One approach to this problem is to increase the choice of synthetic possibilities for the preparation of new polymers wherein increased polarity differences are present within the molecular structure. Any increase of polarity within the polymer structure should increase the amphiphilic properties of the dispersant.

It has surprisingly been found that the increase of polarity is achieved by preparing branched polymers wherein a polymer backbone of predominantly hydrophobic or, in the alternative, predominantly hydrophilic character is present to which defined individual polymer chains of predominantly hydrophilic or, in the alternative, predominantly hydrophobic character are attached. This increase of polarity within the polymer structure is particularly achieved by preparing branched polymers wherein a polymer backbone of predominantly hydrophobic character is present to which defined individual polymer chains of predominantly hydrophilic character are attached.

The present invention relates to comb copolymers of the formula $$\{\text{In-}[(A_x\text{-}B_y)]_p\text{-Z}\}_q \qquad (I),$$

wherein

In represents the fragment of a polymerisation initiator capable of initiating polymerisation of ethylenically unsaturated monomers in the presence of a catalyst which activates controlled radical polymerisation;

A represents an oligopolymer or polymer fragment which consists of ethylenically unsaturated repeating units of polymerizable monomers or oligopolymers;

x represents a numeral greater than one and defines the number of repeating units in A;

B represents a monomer, oligopolymer or polymer fragment copolymerized with A;

y represents zero or a numeral greater than zero and defines the number of monomer, oligopolymer or polymer repeating units in B;

Z represents a polymer backbone which consists of repeating units from polymerizable, ethylenically unsaturated monomers;

p is one or a numeral greater than one which defines the number of groups of the partial formula $$\text{In-}(A_x\text{-}B_y)\text{-} \quad (A)$$

per polymer backbone Z;

q is one or a numeral greater than one which defines the number of groups of the partial formula $$\text{-}(A_x\text{-}B_y)\text{-}Z \quad (B),$$

provided that one of p and q represents one and the other represents one or a numeral greater than one.

The proviso above relates to two alternative embodiments wherein i) one or more groups (A) are attached to one polymer backbone Z. In this case there is one transferable group, such as one chlorine or bromine, per initiator fragment In. In the alternative ii) one or more groups (B) are attached to one initiator fragment In. In this case up to six, preferably up to four, transferable groups are attached to the initiator fragment In.

A preferred embodiment of i) relates to branched comb polymers of the formula $$\{\text{In-}(A_x\text{-}B_y)\}_p\text{-}Z \quad (IA),$$

wherein p is a numeral from one to hundred; and In, A, x, B, y and Z are as defined above.

Another preferred embodiment of ii) relates to branched comb polymers of the formula $$\text{In-}[(A_x\text{-}B_y)\text{-}Z]_q \quad (IB),$$

wherein q is a numeral from one to six, preferably one to four, and In, A, x, B, V and Z are as defined above.

The terms and definitions used in the specification of the present invention preferably have the following meanings:

In the context of the description of the present invention, the term alkyl comprises methyl, ethyl and the isomers of propyl, butyl, pentyl, hexyl, heptyl, octyl, nonyl, decyl, undecyl and dodecyl. An example of aryl-substituted alkyl is benzyl. Examples of alkoxy are methoxy, ethoxy and the isomers of propoxy and butoxy. Examples of alkenyl are vinyl and allyl. An example of alkylene is ethylene, n-propylene, 1,2- or 1,3-propylene.

Some examples of cycloalkyl are cyclopropyl, cyclobutyl, cyclopentyl, cyclohexyl, methylcyclopentyl, dimethylcyclopentyl and methylcyclohexyl. Examples of substituted cycloalkyl are methyl-, dimethyl-, trimethyl-, methoxy-, dimethoxy-, trimethoxy-, trifluoromethyl-, bis-trifluoromethyl- and tris-trifluoromethyl-substituted cyclopentyl and cyclohexyl.

Examples of aryl are phenyl and naphthyl. Examples of aryloxy are phenoxy and naphthyloxy. Examples of substituted aryl are methyl-, dimethyl-, trimethyl-, methoxy-, dimethoxy-, trimethoxy-, trifluoromethyl-, bis-trifluoromethyl- or tris-trifluoromethyl-substituted phenyl. An example of aralkyl is benzyl. Examples of substituted aralkyl are methyl-, dimethyl-, trimethyl-, methoxy-, dimethoxy-, trimethoxy-, trifluoromethyl-, bis-trifluoromethyl or tris-trifluoromethyl-substituted benzyl.

Some examples of an aliphatic carboxylic acid are acetic, propionic or butyric acid. An example of a cycloaliphatic carboxylic acid is cyclohexanoic acid. An example of an aromatic carboxylic acid is benzoic acid. An example of a phosphorus-containing acid is methylphosphonic acid. An example of an aliphatic dicarboxylic acid is malonyl, maleoyl or succinyl. An example of an aromatic dicarboxylic acid is phthaloyl.

The term heterocycloalkyl embraces within the given structure one or two and heterocyclic groups having one to four heteroatoms selected from the group consisting of nitrogen, sulphur and oxygen. Some examples of heterocycloalkyl are tetrahydrofuryl, pyrrolidinyl, piperazinyl and tetrahydrothienyl. Some examples of heteroaryl are furyl, thienyl, pyrrolyl, pyridyl and pyrimidinyl.

An example of a monovalent silyl radical is trimethylsilyl.

In the comb polymer (I) and in the macromonomer (II) In represents the polymerisation initiator fragment of a polymerisation initiator of the formula $$\text{In}\text{—}Y_{q'} \quad (III),$$

wherein In represents the fragment of a polymerisation Initiator capable of initiating polymerisation of monomers or oligopolymers containing ethylene groups, —Y represents a radically transferable atom or group and q' represents one or a numeral greater than one. A suitable polymerisation inhibitor is capable of initiating atomic transfer radical polymerisation of the fragments A and B and subsequently proceeds by a reaction mechanism known under the term ATRP or related methods. A suitable polymerisation initiator, which contains a radically transferable atom or group .X, is described in WO 96/30421 and WO 98/01480. A preferred radically transferable atom or group .X is .Cl or .Br, which is cleaved as a radical from the initiator molecule and subsequently replaced after polymerisation as a leaving group with the polymerizable chain terminal group —X. The index q' is one if one group Y, e.g. chlorine or bromine, is present in the initiator molecule III. A representative initiator molecule III wherein q' is one, is a compound of the formula

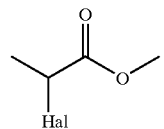

wherein Hal represents chlorine or bromine.

A representative initiator molecule, wherein q' is the numeral three, is a "star-shaped" compound of the formula

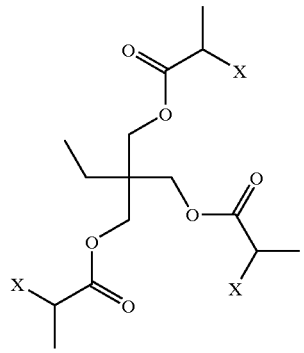

and a representative initiator molecule wherein q' is the numeral up to tour, is a "star-shaped" compound of the formula

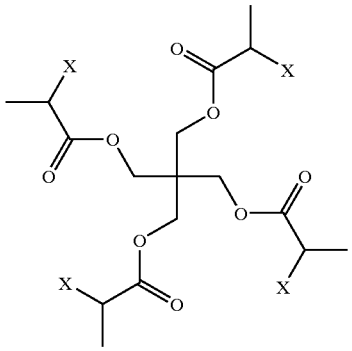

In the formulae above X represents chlorine or bromine. These initiator molecules are prepared by the reaction of a reactive functional derivative of α-halogencarboxylic acid of the formula

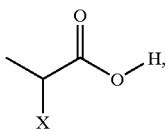

e.g. the acid chloride or bromide of this compound, with an alcohol of the formula

wherein $R_2'$ represents together with the OH— group a branched trihydroxy alcohol, e.g. 1,1,1-(tris-hydroxymethyl)propane or represents a branched tetrahydroxy alcohol, e.g. pentaerythritol.

The use of initiators (III) wherein q' represents one and one transferable group —Y is present per initiator fragment In, generates linear macromonomers (II). Polymerisation initiators wherein q' is greater than one, generate branched macromonomers (II), wherein the individual polymer "branches" are linked together at the initiator fragment In. Branched comb polymers (IB) are obtainable from these macromonomers, particularly branched comb polymers from the "star-shaped" initiators of the formulae above.

A preferred polymerisation initiator (III) which generates linear macromonomers, is selected from the group consisting of $C_1$–$C_8$-alkyl halides, $C_6$–$C_{15}$-aralkylhalides, $C_2$–$C_8$-haloalkyl esters, arene sulphonyl chlorides, haloalkanenitriles, α-haloacrylates and halolactones.

Specific initiators (III) are selected from the group consisting of α,α'-dichloro- or α,α'-dibro-moxylene, p-toluenesulfonylchloride (PTS), hexakis-(α-chloro- or α-bromomethyl)-benzene, 1-phenethyl chloride or bromide, methyl or ethyl 2-chloro- or 2-bromopropionate, methyl or ethyl-2-bromo- or 2-chlorooisobutyrate, and the corresponding 2-chloro- or 2-bromopropionic acid, 2-chloro- or 2-bromoisobutyric acid, chloro- or bromoacetonitrile, 2-chloro- or 2-bromopropionitrile, α-bromo-benzacetonitrile, α-bromo-γ-butyrolactone (=2-bromo-dihydro-2(3H)-furanone) and the initiators derived from 1,1,1-(tris-hydroxymethyl)propane and pentaerythritol of the formulae of above.

The term polymer comprises oligomers, cooligomers, polymers or copolymers, such as block, multi-block, star, gradient, random, comb, hyperbranched and dendritic copolymers as well as graft copolymers. The block copolymer unit A contains at least two repeating units ($x \geq 2$) of polymerizable aliphatic monomers having one or more olefinic double bonds. The block copolymer unit B contains at least one polymerizable aliphatic monomer unit ($y \geq 0$) having one or more olefinic double bonds.

The difference in polarity in the polymer blocks A and B is obtained by copolymerising in each polymer block A and B different amounts of monomers ("functional monomers"), which contain hydrophilic functional groups present in ionic surfactants such as the carboxylate, sulphoxylate, phosphonate, ammonio, alkylated ammonio or hydroxy groups. In a preferred embodiment of the invention the content of monomers containing functional groups in each polymer block A or B differs from the other polymer block by at least 20% by weight. Particularly preferred are acrylic A-B block copolymers of defined structure prepared by the ATRP method or related methods. With a hydrophilic "B" block (neutralised acid or amine containing polymers), the presence of these polymer blocks is useful for preparing water based pigment dispersions. The hydrophobic "A" blocks (homo- or copolymers of methacrylate monomers) are predominantly surface active and associate with either pigment or emulsion polymer surfaces.

Both polymer blocks A and B may contain repeating units of polymerizable monomers having one olefinic double bond. These monomers are preferably selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters.

Suitable styrenes may be substituted at the phenyl group by one to three additional substituents selected from the group consisting of hydroxy, $C_1$–$C_4$-alkoxy, e.g. methoxy or ethoxy, halogen, e.g. chloro, and $C_1$–$C_4$-alkyl, e.g. methyl or ethyl.

Suitable acrylic or $C_1$–$C_4$-alkylacrylic acid-$C_1$–$C_{24}$-alkyl esters are selected from the group consisting of methyl, ethyl, n-butyl, isobutyl, tert.-butyl, 2-ethylhexyl, isobornyl, isodecyl, lauryl, myristyl, stearyl, and behenyl methacrylates and the corresponding acrylates.

Examples of ethylenically unsaturated monomers containing two or more double bonds are diacrylates of ethylene glycol, propylene glycol, neopentyl glycol, hexamethylene glycol or of bisphenol A, 4,4'-bis(2-acryloyloxyethoxy)-diphenylpropane, trimethylolpropane triacrylate or tetraacrylate.

In a preferred embodiment of the invention the polymer block B is more hydrophilic as compared to polymer block A and consists of higher amounts of monomers carrying functional groups. The monomers are selected from the group consisting of 4-aminostyrene, di-$C_1$–$C_4$-alkylaminostyrene, styrene, acrylic acid, $C_1$–$C_4$-alkylacrylic acid, acrylic or $C_1$–$C_4$-alkylacryl-amides, acrylic or $C_1$–$C_4$-alkylacrylmono- or -di-$C_1$–$C_4$-alkylamides, acrylic or $C_1$–$C_4$-alkyl-acryl-di-$C_1$–$C_4$-alkylamino-$C_2$–$C_4$-alkylamides, acrylic or $C_1$–$C_4$-alkylacrylamino-$C_2$–$C_4$-alkylamides, anhydrides and salts of acrylic acid or $C_1$–$C_4$-alkylacrylic acid, acrylic or $C_1$–$C_4$-alkylacrylic acid-mono- or -di-$C_1$–$C_4$-alkylamino-$C_2$–$C_4$-alkyl esters, acrylic or $C_1$–$C_4$-alkylacrylic acid-hydroxy-$C_2$–$C_4$-alkyl esters, acrylic or $C_1$–$C_4$-alkylacrylic acid-($C_1$–$C_4$alkyl)$_3$silyloxy-$C_2$–$C_4$-alkyl esters, acrylic or $C_1$–$C_4$-alkylacrylic acid ($C_1$–$C_4$-alkyl)$_3$silyl-$C_2$–$C_4$alkyl esters, acrylic or $C_1$–$C_4$-alkylacrylic acid-heterocyclyl-$C_2$–$C_4$-alkyl esters, $C_1$–$C_{24}$-alkoxylated poly-$C_2$–$C_4$-alkylene glycol acrylic or $C_1$–$C_4$-alkylacrylic acid esters, acrylic acid-$C_1$–$C_{24}$-alkyl esters and $C_1$–$C_4$-alkylacrylic acid-$C_1$–$C_{24}$-alkyl esters.

Suitable monomers are also vinyl substituted heterocycles, e.g. N-vinyl-pyrrolidone, styrene sulfonic acid and salts, vinylbenzoeic acid and salts, vinylformamide and amidosulphonic acid derivatives.

The above-mentioned salts are obtained by reaction with organic or inorganic acids or by quaternisation.

Specific examples of the above-mentioned functional monomers are acrylic acid or methacrylic acid, acid anhydrides and salts thereof, e.g. acrylic acid or methacrylic acid ($C_1$–$C_4$-alkyl)ammonium salts, acrylic acid or methacrylic acid-($C_1$–$C_4$-alkyl)$_3$NH salts, such as the acrylic acid or methacrylic acid tetramethylammonium salt, the tetraethylammonium, trimethyl-2-hydroxyethylammonium or the triethyl-2-hydroxyethylammonium salt, the acrylic acid or methacrylic acid trimethyl ammonium salt, the triethylammonium, dimethyl-2-hydroxyethylammonium or the dimethyl-2-hydroxyethylammonium salt.

Specific examples of $C_1$–$C_4$-alkylacrylic acid-mono- or -di-$C_1$–$C_4$-alkylamino-$C_2$–$C_4$-alkyl esters are acrylic or methacrylic acid-2-monomethylaminoethylester, acrylic or methacrylic acid-2-dimethylaminoethylester or the 2-monoethylaminoethyl or 2-diethylaminoethyl esters or the acrylic or methacrylic acid-2-tert.-butylaminoethylester as well as the corresponding salts of these amino substituted (meth)acrylates.

Specific examples of acrylic or $C_1$–$C_4$-alkylacrylic acid-hydroxy-$C_2$–$C_4$-alkyl esters are acrylic or methacrylic acid-2-hydroxyethylester (HEA, HEMA) or acrylic or methacrylic acid-2-hydroxypropylester (HPA, HPMA).

Specific examples of the above-mentioned $C_1$–$C_4$-alkylacrylic acid-heterocyclyl-$C_2$–$C_4$-alkyl esters are acrylic or methacrylic acid-2-(N-morpholinyl)-ethyl ester. Acrylic or $C_1$–$C_4$-alkyl-acrylic acid-silyloxy-$C_2$–$C_4$-alkyl esters are exemplified by acrylic or methacrylic acid-2-trimethylsilyloxyethylester (TMS-HEA, TMS-HEMA). Acrylic or $C_1$–$C_4$-alkylacrylic acid($C_1$–$C_4$-alkyl)$_3$silyl-$C_2$–$C_4$-alkyl esters are exemplified by acrylic or methacrylic acid-2-trimethylsilylethylester or acrylic or methacrylic acid-3-trimethylsilyl-n-propylester.

$C_1$–$C_{24}$-Alkoxylated poly-$C_2$–$C_4$-alkylene glycol acrylic or $C_1$–$C_4$-alkylacrylic acid esters are exemplified by acrylates and methacrylates of the formula

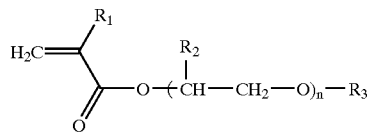

wherein $R_1$ and $R_2$ independently of one another represent hydrogen or methyl and $R_3$ represents $C_1$–$C_{24}$-alkyl, such as methyl, ethyl, n- or isopropyl, n-, iso-, or tert.-butyl, n- or neopentyl, lauryl, myristyl or stearyl or aryl-$C_1$–$C_{24}$-alkyl, such as benzyl or phenyl-n-nonyl, $C_1$–$C_{24}$-alkylaryl or $C_1$–$C_{24}$-alkylaryl-$C_1$–$C_{24}$-alkyl.

Acrylic or $C_1$–$C_4$-alkylacrylic acid-heterocyclyl-$C_2$–$C_4$-alkyl esters are exemplified by acrylic or methacrylic acid-2-(2-pyridyl, -1-imidazolyl, -2-oxo-1-pyrrolidinyl, -4-methylpiperidin-1-yl, or -2-oxo-imidazolidin-1-yl)-ethyl ester.

The above-mentioned acrylic or $C_1$–$C_4$-alkylacrylamides, acrylic or $C_1$–$C_4$-alkylacrylmono- or -di-$C_1$–$C_4$-alkylamides, acrylic or $C_1$–$C_4$-alkylacryl-di-$C_1$–$C_4$-alkylamino-$C_2$–$C_4$-alkylamides and acrylic or $C_1$–$C_4$-alkylacryl-amino-$C_2$–$C_4$alkylamides are exemplified by acrylamide, methacrylamide, N,N-dimethylacrylamide, N,N-dimethyl(meth)acrylamide, 2-(N,N-dimethylaminoethyl)-acrylamide, 2-(N,N-dimethylaminoethyl)-methacrylamide, 2-(N,N-dimethylaminopropyl)-methacrylamide, 2-aminoethylacrylamide and 2-aminoethylmethacrylamide.

Vinyl substituted heterocyles are exemplified by vinylpyrrolidone, vinylimidazole, vinylcarbazole and vinylpyridine and amidosulphonic acid derivatives by 2-acrylamido-2-methylpropanesulfonic acid.

Di-$C_1$–$C_4$-alkylaminostyrene are exemplified by 4-N,N-dimethylaminostyrene.

The above-mentioned monomers containing functional groups may be derivatised to render them more hydrophilic as described in U.S. Pat. No. 4,656,226 and EP-A-311 157.

It is to be understood, that the above described functional monomers, especially monomers containing basic amino groups, can also be used in form of their corresponding salts. For example acrylates, methacrylates or styrenes containing amino groups can be used as salts with organic or inorganic acids or by way of quaternisation with known alkylation agents like benzyl chloride. The salt formation can also be done as a subsequent reaction on the preformed block copolymer with appropriate reagents. In another embodiment, the salt formation is carried out in situ in compositions or formulations, for example by reacting a block copolymer with basic or acidic groups with appropriate neutralisation agents during the preparation of a pigment concentrate.

In a preferred embodiment of the invention the polymer blocks A or B or both are reaction products with reactive functional monomers selected from the group consisting of glycidyl acrylic or $C_1$–$C_4$-alkylacrylic acid esters, 2-isocyanatoethyl acrylic or $C_1$–$C_4$-alkylacrylic acid esters and $C_3$–$C_8$-alkyl- or $C_3$–$C_8$-alkenyl-dicarboxylic acid anhydrides.

The index x in the polymer block A represents a numeral greater than one and defines the number of monomer repeating units in A. The lowest number is two. A preferred range of x is from 2 to 1000.

y represents zero or a numeral greater than zero and defines the number of monomer repeating units in B. A preferred range of y is from 0 to 1000.

In one especially preferred embodiment y represents zero. In that event the macromonomer consists only of one block terminated by a polymerisable end group.

In the comb copolymer (I) the preferred molecular weight range of blocks A and B is from about 1 000 to 100 000 and particularly from about 1 000 to 50 000. A highly preferred range is from about 2 000 to 15 000.

Z represents a polymer backbone which consists of repeating units of polymerizable, ethylenically unsaturated monomers selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters, aminofunctional acrylic acid esters or aminofunctional $C_1$–$C_4$-alklylacrylic esters, acrylonitrile, methacrylonitrile, vinyl substituted heterocycles, styrene sulfonic acid and salts, vinylbenzoeic acid and salts, vinylformamide and amidosulphfonic acid derivatives.

Specific examples of these monomers are described above in respect of the monomers forming the polymer blocks A or B.

The index p is one or a numeral greater than one (p≧1) which defines the number of groups of the partial formula (A) per polymer backbone Z. The number of side chains to Z is unlimited. In a preferred embodiment of the invention p is a numeral from one to hundred.

The index q is one or a numeral greater than one ($q \geq 1$) which defines the number of groups of the partial formula (B) per initiator fragment In. In a preferred embodiment of the invention q is a numeral from one to six; especially one to four.

A preferred embodiment of the invention relates to comb polymer of the formula I, wherein In represents the fragment of a polymerisation initiator selected from the group consisting of $C_1$–$C_8$-alkylhalides, $C_6$–$C_{15}$-aralkylhalides, $C_2$–$C_8$-haloalkyl esters, arene sulphonyl chlorides, haloalkanenitriles, α-haloacrylates and halolactones;

A and B represent polymer blocks which differ in polarity and contain repeating units of polymerizable, ethylenically unsaturated monomers selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters;

x and y are as defined above;

Z represents a polymer backbone which consists of repeating units of polymerizable, ethylenically unsaturated monomers selected from the group consisting of styrenes, acrylic acid, $C_1$–$C_4$-alkylacrylic acid, amides, anhydrides and salts of acrylic acid or $C_1$–$C_4$-alkyl-acrylic acid, acrylic acid-$C_1$–$C_{24}$-alkyl esters and $C_1$–$C_4$-alkylacrylic acid-$C_1$–$C_{24}$-alkyl esters, aminofunctional acrylic acid esters or aminofunctional $C_1$–$C_4$-alkylacrylic esters, acrylonitrile, methacrylonitrile, vinyl substituted heterocycles, styrene sulfonic acid and salts, vinylbenzoeic acid and salts, vinylformamide and amidosulphonic acid derivatives;

p represents a numeral from one to hundred; and q represents one.

A particularly preferred embodiment of the invention relates to comb polymers of the formula I, wherein In represents fragment of a polymerisation initiator which is selected from the group consisting of $C_1$–$C_8$-alkylhalides, $C_8$–$C_{15}$-aralkylhalides, $C_2$–$C_8$-haloalkyl esters, arene sulphonyl chlorides, haloalkanenitriles, α-haloacrylates and halolactones;

A and B represent polymer blocks which differ in polarity and contain repeating units of polymerizable, ethylenically unsaturated monomers selected from the group consisting of 4-aminostyrene, di-$C_1$–$C_4$-alkylaminostyrene, styrene, acrylic acid, $C_1$–$C_4$-alkylacrylic acid, acrylic or $C_1$–$C_4$-alkylacrylamides, acrylic or $C_1$–$C_4$-alkylacrylmono- or -di-$C_1$–$C_4$-alkylamides, acrylic or $C_1$–$C_4$-alkylacryl-di-$C_1$–$C_4$-alkylamino-$C_2$–$C_4$-alkylamides, acrylic or $C_1$–$C_4$-alkylacryl-amino-$C_2$–$C_4$alkylamides, anhydrides and salts of acrylic acid or $C_1$–$C_4$-alkylacrylic acid, acrylic or $C_1$–$C_4$-alkylacrylic acid-mono- or -di-$C_1$–$C_4$-alkylamino-$C_2$–$C_4$-alkyl esters, acrylic or $C_1$–$C_4$-alkylacrylic acid-hydroxy-$C_2$–$C_4$-alkyl esters, acrylic or $C_1$–$C_4$-alkylacrylic acid-($C_1$–$C_4$-alkyl)$_3$silyloxy-$C_2$–$C_4$-alkyl esters, acrylic or $C_1$–$C_4$-alkylacrylic acid-($C_1$–$C_4$-alkyl)$_3$silyl-$C_2$–$C_4$-alkyl esters, acrylic or $C_1$–$C_4$-alkylacrylic acid-heterocyclyl-$C_2$–$C_4$-alkyl esters, $C_1$–$C_{24}$-alkoxylated poly-$C_2$–$C_4$-alkylene glycol acrylic or $C_1$–$C_4$-alkylacrylic acid esters, acrylic acid-$C_1$–$C_{24}$-alkyl esters and $C_1$–$C_4$-alkylacrylic acid-$C_1$–$C_{24}$-alkyl esters;

x and y are as defined above;

Z represents a polymer backbone which consists of repeating units from polymerizable ethylenically unsaturated monomers selected from the group consisting of 4-aminostyrene and salts thereof, di-$C_1$–$C_4$-alkylaminostyrene and salts thereof, acrylic or $C_1$–$C_4$-alkyl-acrylic acid or anhydrides and salts thereof, acrylic or $C_1$–$C_4$-alkylacrylic acid-mono- or -di-$C_1$–$C_4$-alkylamino-$C_2$–$C_4$-alkyl esters and salts thereof, such as 2-dimethylaminoethyl methacrylate, 2-diethylaminoethyl methacrylate or 2-t-butylaminoethyl methacrylate, acrylic or $C_1$–$C_4$-alkylacrylic acid-hydroxy-$C_2$–$C_4$-alkyl esters, acrylic or $C_1$–$C_4$-alkylacrylic acid-($C_1$–$C_4$-alkyl)$_3$silyloxy-$C_2$–$C_4$-alkyl esters, acrylic or $C_1$–$C_4$-alkylacrylic acid-($C_1$–$C_4$-alkyl)$_3$silyl-$C_2$–$C_4$-alkyl esters, acrylic or $C_1$–$C_4$-alkylacrylic acid-heterocyclyl-$C_2$–$C_4$-alkyl esters and salts thereof, $C_1$–$C_{24}$-alkoxylated poly-$C_2$–$C_4$-alkylene glycol acrylic or $C_1$–$C_4$-alkylacrylic acid esters, acrylic or $C_1$–$C_4$-alkylacrylamides, acrylic or $C_1$–$C_4$-alkylacrylmono- or -di-$C_1$–$C_4$-alkylamides, acrylic or $C_1$–$C_4$-alkylacryl-di-$C_1$–$C_4$-alkylamino-$C_2$–$C_4$-alkylamides and salts thereof, acrylic or $C_1$–$C_4$-alkylacryl-amino-$C_2$–$C_4$alkylamides, acrylonitrile, methacrylonitrile, 4-aminostyrene and salts thereof, di-$C_1$–$C_4$-alkylaminostyrene and salts thereof, vinyl substituted heterocycles, styrene sulfonic acid and salts, vinylbenzoeic acid and salts, vinylformamide and amidosulphonic acid derivatives;

p represents a numeral from one to hundred; and q represents one.

Highly preferred are comb polymers of the formula I, wherein

In represents the fragment of a polymerisation initiator which is selected from the group consisting of $C_1$–$C_8$-alkyl halides, $C_6$–$C_{15}$-aralkylhalides, $C_2$–$C_8$-haloalkyl esters, arene sulphonyl chlorides, haloalkanenitriles, α-haloacrylates and halolactones;

A and B represent polymer blocks containing repeating units of polymerizable, ethylenically unsaturated monomers selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters;

x and y are as defined above;

Z represents a polymer block which consists of repeating units from polymerizable ethylenically unsaturated monomers selected from the group consisting of acrylic or $C_1$–$C_4$-alkyl-acrylic acid or anhydrides and salts thereof, acrylic or $C_1$–$C_4$-alkylacrylic acid-mono- or -di-$C_1$–$C_4$-alkylamino-$C_2$–$C_4$-alkyl esters and salts thereof, acrylic or $C_1$–$C_4$-alkylacrylic acid-hydroxy-$C_2$–$C_4$-alkyl esters, acrylic or $C_1$–$C_4$-alkylacrylic acid-($C_1$–$C_4$-alkyl)$_3$silyloxy-$C_2$–$C_4$-alkyl esters, acrylic or $C_1$–$C_4$-alkylacrylic acid-($C_1$–$C_4$-alkyl)$_3$silyl-$C_2$–$C_4$-alkyl esters, acrylic or $C_1$–$C_4$-alkylacrylic acid-heterocyclyl-$C_2$–$C_4$-alkyl esters and salts thereof, $C_1$–$C_{24}$-alkoxylated poly-$C_2$–$C_4$-alkylene glycol acrylic or $C_1$–$C_4$-alkylacrylic acid esters, acrylic or $C_1$–$C_4$-alkylacrylamides, acrylic or $C_1$–$C_4$-alkylacrylmono- or -di-$C_1$–$C_4$-alkyl-amides, acrylic or $C_1$–$C_4$-alkylacryl-di-$C_1$–$C_4$-alkylamino$C_2$–$C_4$-alkylamides and salts thereof, acrylic or $C_1$–$C_4$-alkylacryl-amino-$C_2$–$C_4$alkylamides, acrylonitrile, methacrylonitrile, 4-aminostyrene and salts thereof, di-$C_1$–$C_4$-alkylaminostyrene and salts thereof, vinyl substituted heterocycles, styrene sulfonic acid and salts, vinylbenzoeic acid and salts, vinylformamide and amidosulphonic acid derivatives;

p represents a numeral from one to hundred; and q represents one.

The comb polymers (I) as well as the macromonomers (II) defined below can be further processed for preparing compositions and dispersions based on these compositions and used in most cases without any further purification step. This is an important advantage when industrial scale-up is intended. In specific cases it can be advantageous to modify the resultant comb polymer by additional reaction step(s) for example by (complete or partial) neutralisation of incorporated aminofunctional monomers with organic or inorganic acids or by quaternisation the same with strong alkylation agents.

The present invention also relates to a composition comprising
a) a comb copolymer (I) as defined above; and
b) dispersible inorganic or organic pigment particles.

In a preferred embodiment of the invention relating to the composition defined above the dispersible organic pigment particles of the component b) are selected from the azo pigment group consisting of azo, disazo, napthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, pigments and pearlescent flakes.

In another preferred embodiment of the invention relating to the composition defined above the dispersible inorganic pigment particles of the component b) are selected from the group consisting of aluminium, aluminium oxide, silicon oxide and silicates, iron(III)oxide, chromium(III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, chromates, and molybdates, and mixtures, crystal forms or modifications thereof.

The compositions mentioned above may additionally contain binding agents and conventional additives selected from the group consisting of surfactants, stabilisers, anti-foaming agents, dyes, plasticizers, thixotropic agents, drying catalysts, anti-skinning agents and leveling agents.

The compositions may also comprise a liquid carrier selected from the group consisting of water, organic solvents and mixtures thereof.

The compositions of above, particularly the pigment dispersions, are useful for variety of uses, e.g. the preparation of inks or printing inks in printing processes, such as flexographic, screen, packaging, security ink, intaglio or offset printing, for pre-press stages and for textile printing, for office, home or graphic applications, for paper goods, for pens, felt tips, fibre tips, card, wood, (wood) stains, metal, inking pads, or inks for impact printing, (with impact-pressure ink ribbons), or for the preparation of colorants, for coatings, e.g. paints, for textile decoration and industrial marking, for roller coatings or powder coatings or powder coatings or for automotive finishes for high-solids, low-solvent, water containing or metallic coating materials or for water-containing formulations, water-containing paints, or for the preparation of pigment plastics for coatings, fibers, platters or mold carriers, or for non-impact printing material, for digital printing, for thermal wax transfer printing, for Ink jet printing or for thermal transfer printing, or for the preparation of colour filters, especially for visible light in the range from 400 to 700 nm, which can be used for the production of liquid crystal displays (LCD) or charge combined devices (CCD) or for the preparation of cosmetics, toners, or polymeric ink particles for the preparation of toners for dry copy toners and liquid copy toners, or electrophotographic toners. The toners can be prepared in masterbatches and be used in turn in masterbatches for the preparation of coloured plastics.

The pigments are added to the polymer dispersant by using conventional techniques, such as high speed mixing, ball milling, sand grinding, attrition grinding or two or three roll milling. The resulting pigment dispersion may have a pigment to dispersant weight ratio of about 0.1:100:1000:1.

The invention also relates to the process for preparing the pigment dispersion, which comprises dispersing in a liquid carrier selected from the group consisting of water, organic solvents and mixtures thereof the pigment particles in the presence of a comb polymer of the formula I as defined above or, in the alternative, in the presence of a macromonomer (II) as defined below.

The organic solvents present in the dispersion are mentioned above, cf. process, and preferably are polar, water-miscible solvents such as $C_1$–$C_4$alkohols, e.g. methanol, ethanol, or isopropanol, polyols, e.g. glycerol, or ethylene, diethylene, triethylene, triethylene or propylene glycol.

In a preferred embodiment of this process, fine pigment dispersions are prepared by mixing the pigments with a solution or dispersion of the comb polymer (I) or macromonomer (II) or both, optionally in presence of further surfactants, concentrating the resulting mixture by distilling off the solvents, preferably to dryness, and optionally subjecting the resulting concentrate to thermal treatment to prepare a mixture comprising pigments and polymers which may then be subsequently dispersed in aqueous and/or organic solvents. This method allows the preparation of easily dispersible modified pigments.

Any known methods for preparing the composition defined above, such as high speed mixing, ball milling, sand grinding, attritor grinding or two or three roll milling may in the alternative be employed when preparing the dispersion.

Another preferred embodiment of the invention are compositions containing dispersible inorganic or organic pigment particles and comb polymers containing aminic groups which are modified by partial or full neutralization with suitable organic acids or quaternised with alkylating agents. These "modified comb polymers" can be used according to different processes to prepare stabilised pigment containing compositions. In one embodiment the modified comb polymer is prepared separately, for example as a concentrated additive solution, and then added for example to the mill-race. In an other embodiment the aminic comb polymer and the organic acid are added separately and optionally at different times to the pigment grind. In this case the "modified comb polymer" is prepared in situ during the grinding of the pigment. In another embodiment the organic acid and/or the aminic comb polymer can also be first adsorbed onto the pigments to give surface treated pigments. These surface treated pigments can later be easily incorporated into pigment concentrates or paint formulations, optionally with further addition of dispersants.

Likewise of particular interest is a specific embodiment of the above-mentioned process for preparing the composition, wherein coating compositions, for example paints, are prepared. The invention also relates to compositions, wherein polymeric film-forming binders for coatings are added.

A preferred embodiment of the invention relates to a coating composition comprising
a') a comb copolymer (I) as defined above; and
b') a polymeric binder based on aqueous emulsion and aqueous dispersion polymers.

The coating composition preferably comprises 0.01–10 parts by weight of the combined components a) and b) In the composition, in particular 0.05–10 parts, especially 0.1–5 parts, per 100 parts by weight of solid binder.

The binder may be any binders which are customary in industrial applications, for example the ones described in *Ullmann's Encyclopedia of Industrial Chemistry, 5th Edition, Vol. A*18, pp. 368–426, VCH, Weinheim 1991, Germany. In general, a film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air drying resins can be used.

The binder can be any cold-curable or hot-curable binder, the addition of a curing catalyst may be advantageous. Suitable catalysts which accelerate curing of the binder are described, for example, in *Ullmann's, Vol. A*18, p. 469.

Preference is given to coating compositions in which the binder comprises a functional acrylate resin and a crosslinking agent. Examples of coating compositions containing specific binders are:

1) paints based on cold- or hot-crosslinkable alkyd, acrylate, polyester, epoxy or melamine resins or mixtures of such resins, it desired with addition of a curing catalyst;
2) two-component polyurethane paints based on hydroxyl-containing acrylate, polyester or polyether resins and aliphatic or aromatic isocyanates, isocyanurates or polyisocyanates;
3) one-component polyurethane paints based on blocked isocyanates, isocyanurates or polyisocyanates which are deblocked during baking, if desired with addition of a melamine resin;
4) one-component polyurethane paints based on a tris-alkoxycarbonyltriazine crosslinker and a hydroxyl group containing resin such as acrylate, polyester or polyether resins;
5) one-component polyurethane paints based on aliphatic or aromatic urethaneacrylates or polyurethaneacrylates having free amino groups within the urethane structure and melamine resins or polyether resins, if necessary with curing catalyst;
6) two-component paints based on (poly)ketimines and aliphatic or aromatic isocyanates, isocyanurates or polyisocyanates;
7) two-component paints based on (poly)ketimines and an unsaturated acrylate resin or a polyacetoacetate resin or a methacrylamidoglycolate methyl ester;
8) two-component paints based on carboxyl- or amino-containing polyacrylates and polyepoxides;
9) two-component paints based on acrylate resins containing anhydride groups and on a polyhydroxy or polyamino component;
10) two-component paints based on acrylate-containing anhydrides and polyepoxides;
11) two-component paints based on (poly)oxazolines and acrylate resins containing anhydride groups, or unsaturated acrylate resins, or aliphatic or aromatic isocyanates, isocyanurates or polyisocyanates;
12) two-component paints based on unsaturated polyacrylates and polymalonates;
13) thermoplastic polyacrylate paints based on thermoplastic acrylate resins or externally crosslinking acrylate resins in combination with etherified melamine resins;
14) paint systems based on siloxane-modified or fluorine-modified acrylate resins.

In addition to the components mentioned above, the compositions according to the invention preferably comprises a light stabiliser of the sterically hindered amine type, the 2-(2-hydroxyphenyl)-1,3,5-triazine and/or the 2-hydroxyphenyl-2H-benzotriazole type. Further examples for light stabilisers of the 2-(2-hydroxyphenyl)-1,3,5-triazine type advantageously to be added can be found e.g. in the published patent literature, e.g. U.S. Pat. No. 4,619,956, EP-A-434 608, U.S. Pat. Nos. 5, 198,498, 5,322,868, 5,369,140, 5,298,067, WO-94/18278, EP-A-704 437, GB-A-2,297,091, WO-96/28431. Of special technical interest is the addition of the 2-(2-hydroxyphenyl)-1,3,5-triazines and/or 2-hydroxyphenyl-2H-benzotriazoles, especially the 2-(2-hydroxyphenyl)-1,3,5-triazines.

Apart from the components mentioned above, the composition may also comprise further components, examples being solvents, pigments, dyes, plasticizers, stabilisers, thixotropic agents, drying catalysts and/or leveling agents. Examples of possible components are those described in *Ullmann's, Vol. A*18, pp. 429–471.

Useful drying catalysts or curing catalysts are, for example, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti or Zr, or organometallic compounds such as organotin compounds.

Examples of metal carboxylates are the stearates of Pb, Mn or Zn, the octanoates of Co, Zn or Cu, the naphthenoates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethylmorpholine, N-methylmorpholine or diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst used can also be a phosphine, for example triphenylphosphine.

A specific embodiment of the novel compositions are radiation-curable coating compositions. In this embodiment, the binder essentially comprises monomeric or oligomeric compounds containing ethylenically unsaturated bonds, which, after application, are cured by actinic radiation and converts them into a crosslinked, high molecular weight form. In the event that the composition is UV-curing, it generally contains a photoinitiator as well. Corresponding systems are described in the above-mentioned reference book *Ullmann's, Vol. A*18, pp. 451–453. In radiation-curable coating compositions, the novel stabilizers can also be employed without the addition of so-called sterically hindered amines.

The compositions according to the invention are used by applying them to any suitable substrate, for example to metal, wood, plastic or ceramic materials. They are preferably used as topcoat in the finishing of automobiles. If the topcoat comprises two layers, of which the lower layer is pigmented and the upper layer is not pigmented, the novel coating composition can be used for either the upper or the lower layer or for both layers, but preferably for the upper layer. The compositions are applied to the substrates by the customary methods, for example by brushing, spraying, pouring, dipping or electrophoresis; see also *Ullmann's*, Vol. A18, pp. 491–500.

Depending on the binder system, the coatings can be cured at room temperature or by heating. The coatings are preferably cured at 50–150° C., and in the case of powder coatings or coil coatings even at higher temperatures.

The coatings obtained in accordance with the invention have excellent resistance to the damaging effects of light, oxygen and heat; particular mention should be made of the good light stability and weathering resistance of the coatings thus obtained, for example paints.

Therefore, the invention also relates to a coating, in particular a paint, which has been stabilised against the damaging effects of light, oxygen and heat by a content of a comb polymer(I) and/or a macromonomer (II) according to the invention. The paint is preferably a topcoat for automobiles. The invention furthermore relates to a process for stabilising a coating based on organic polymers against damage by light, oxygen and/or heat, which comprises mixing with the coating composition a mixture comprising a comb polymer (I) and/or a macromonomer (II), and to the use of mixtures comprising a compound of the in coating compositions polymer(I) and/or a macromonomer (II) as stabilizers against damage by light, oxygen and/or heat.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solid paint or can be solvent-free (e.g. a powder coating material). Powder coatings are, for example, the ones described in *Ullmann's*, A18, pp. 438–444. The powder coating material may also have the form of a powder-slurry (dispersion of the powder preferably in water).

Likewise preferred is the use of the coating composition as a topcoat for applications in the automobile industry, especially as a pigmented or unpigmented topcoat of the paint finish. The alternative use for underlying coats is also possible.

The above-mentioned compositions or disperse systems, particularly coating compositions may additionally contain fillers, such as calcium carbonate, silicates, glass fibers, glass beads, talc, kaolin, mica, barium sulphate, metal oxides and hydroxides, carbon black, graphite, wood powders, powders and fibers of other natural products, synthetic fibers, plasticisers, lubricants, emulsifiers, pigments, rheology additives, catalysts, flow auxiliaries, optical brighteners, flame retardants, antistatics, blowing agents.

The comb copolymers of the formula I according to the present invention are prepared by methods which are known per se by polymerising a macromonomer of the formula

$$\text{In-}[(A_x\text{-}B_y)\text{-}X]_q \qquad (II),$$

wherein In, A, B, x, y and q are as defined above and X represents a polymerizable, ethylenically unsaturated monomer unit with different amounts of polymerizable ethylenically unsaturated monomers.

The known methods for polymerisation may be employed, such as radical polymerisation with initiators of the nitrile type, e.g. AIBN, or peroxides, e.g. benzoylperoxide or di-tert.-butyl peroxide. The macromonomers (II) used in this process are also subject matter of the present invention.

The present invention also relates to macromonomers of the formula

$$\text{In-}[(A_x\text{-}B_y)\text{-}X]_q \qquad (II),$$

wherein
In represents the fragment of a polymerisation initiator capable of initiating polymerisation of ethylenically unsaturated monomers in the presence of a catalyst which activates controlled radical polymerisation;
A represents an oligopolymer or polymer fragment which consists of ethylenically unsaturated repeating units of polymerizable monomers or oligopolymers;
x represents a numeral greater than one and defines the number of repeating units in A;
B represents a monomer, oligopolymer or polymer fragment copolymerized with A;
y represents zero or a numeral greater than zero and defines the number of monomer, oligopolymer or polymer repeating units in B;
X represents a polymerizable, ethylenically unsaturated monomer unit; and
q represents one or a numeral greater than one and defines the number of groups of the partial formula

$$\text{-}(A_x\text{-}B_y)\text{-}X \qquad (B')$$

per initiator fragment In.

The above-mentioned macromonomers (II) are defined by the presence of one polymerizable, ethylenically unsaturated monomer unit X per polymer fragment

$$\text{In-}(A_x\text{-}B_y)\text{-} \qquad (A)$$

and a "functionality" of —X which is $\leq 1$.

A preferred embodiment of the present invention relates to the macromonomer (II), wherein
In represents the fragment of a polymerisation initiator which is selected from the group consisting of $C_1$–$C_8$-alkylhalides, $C_8$–$C_{15}$-aralkylhalides, $C_2$–$C_8$-haloalkyl esters, arene sulphonyl chlorides, haloalkanenitriles, α-haloacrylates and halolactones;
A and B represent polymer blocks which differ in polarity and contain repeating units of polymerizable, ethylenically unsaturated monomers selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters;
X represents a polymerizable, ethylenically unsaturated monomer unit selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters, acrylonitrile, methacrylonitrile, vinyl substituted heterocycles, styrene sulfonic acid and salts, vinylbenzoeic acid and salts, vinylformamide and amidosulphonic acid derivatives; and
q represents a numeral from one to tour.
Additional preferred embodiments also relate to macromonomers (II), wherein In, A, x, B and y have the above-mentioned preferred meanings in respect of the comb polymers (I). The polymerizable, ethylenically unsaturated monomer unit —X has the same preferred meanings mentioned above in respect of the monomer units present in the polymer backbone Z.

The macromonomers (II) defined above can be further processed in essentially the same way as the comb polymers (I). The macromonomers (II) may be used in most cases without any further purification step for preparing compositions and dispersions based on these compositions.

Therefore, the present Invention also relates to a composition comprising
a") a macromonomer (II) as defined above; and
b") dispersible inorganic or organic pigment particles.

The same components b') may be present in the compositions as defined above in respect of the compositions comprising the comb polymers of the formula I. The same preferred embodiments, applications and uses described above, e.g. as coating compositions, also apply to the compositions comprising the macromonomers (II). The compositions may also comprise mixtures containing comb polymers (I) and macromonomers (II).

A particularly preferred embodiment of the invention relates to a composition comprising
α) the macromonomer (II) as defined above; and
β) at least one curing agent.

Suitable curing agents are described above in respect of the coating compositions comprising the comb polymers (I). Especially suitable are free radical initiators, e.g. azo-compounds, peroxide compounds, redox initiator systems or photoinitiators.

The present invention also relates to the process for the preparation of a macromonomer (II) wherein In A, B, x, y, X and q are as defined above, which comprises polymerising by atom transfer radical polymerisation (ATRP) in the presence of catalytically effective amount of an oxidisable transition metal complex catalyst an aliphatic monomer or oligomer containing ethylene groups in the presence of a polymerisation initiator

$$\text{In}-Y_{q'} \quad (III),$$

wherein In represents the fragment of a polymerisation initiator capable of initiating polymerisation of monomers or oligopolymers containing ethylene groups, —Y represents a radically transferable atom or group and q' represents one or a numeral greater than one, and replacing —Y in a polymerisate of the formula

$$\text{In}-[(A_x-B_y)-Y]_q \quad (IV)$$

with the polymerizable, ethylenically unsaturated monomer unit —X.

The polymerisation process may be carried out in the presence of water or an organic solvent or mixtures thereof. Additional cosolvents or surfactants, such as glycols or ammonium salts of fatty acids, may be added to the reaction mixture. The amount of solvent should be kept as low as possible. The reaction mixture may contain the above-mentioned monomers or oligomers in an amount of 1.0 to 99.9% by weight, preferably 5.0 to 99.9% by weight, and especially preferably 50.0 to 99.9% by weight, based on the monomers present in the polymerisate.

If organic solvents are used, suitable solvents or mixtures of solvents are typically pure alkanes (hexane, heptane, octane, isooctane), hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether, tetrahydrofuran), or mixtures thereof.

If water is used as a solvent the reaction mixture can be supplemented with a water-miscible or hydrophilic cosolvent. The reaction mixture will then remain in a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until full completion of the polymerisation. Exemplary cosolvents useful in the process may be selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organosulphides, sulphoxides, sulphones, alcohol derivatives, hydroxyether derivatives such as butyl carbitol or cellosolve, amino alcohols, ketones, and the like, as well as derivatives and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic solvents are selected for the process, the water to cosolvent weight ratio Is typically in the range of about 100:0 to about 10:90.

When monomer mixtures or monomer/oligomer mixtures are used, the calculation of mol % is based on an average molecular weight of the mixture.

The polymerisation temperature may range from about 50° C. to about 180° C., preferably from about 80°C. to about 150° C. At temperatures above about 180° C., the controlled conversion of the monomers into polymers may decrease, and undesirable by-products like thermally initiated polymers are formed or decomposition of the components may occur.

A suitable catalyst capable of activating ATRP is a transition metal complex catalyst salt present as an oxidisable complex Ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Cr^{2+}/Cr^{3+}$, $Co^+/Co^{2+}$, $Co^{2+}/Co^{3++}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$ or $Zn^+/Zn^{2+}$.

The ionic charges are counterbalanced by anionic ligands commonly known in complex chemistry of transition metals, such hydride ions (H⁻) or anions derived from inorganic or organic acids, examples being halides, e.g. F⁻, Cl⁻, Br⁻ or I⁻, halogen complexes with transition metals, such as $Cu^1Br_2^-$, halogen complexes of the type $BF_4^-$, $PF_6^-$, $SbF_6^-$ or $AsF_6^-$, anions of oxygen acids, alcoholates or acetylides or anions of cyclopentadiene.

Anions of oxygen acids are, for example, sulphate, phosphate, perchlorate, perbromate, periodate, antimonate, arsenate, nitrate, carbonate, the anion of a $C_1$–$C_8$carboxylic acid, such as formate, acetate, propionate, butyrate, benzoate, phenylacetate, mono-, di- or trichloro- or -fluoroacetate, sulfonates, for example methylsulfonate, ethylsulfonate, propylsulfonate, butylsulfonate, trifluoromethylsulfonate (triflate), unsubstituted or $C_1$–$C_4$alkyl-, $C_1$–$C_4$alkoxy- or halo-, especially fluoro-, chloro- or bromo-substituted phenylsulfonate or benzylsulfonate, for example tosylate, mesylate, brosylate, p-methoxy- or p-ethoxyphenylsulfonate, pentafluorophenylsulfonate or 2,4,6-triisopropylsulfonate, phosphonates, for example methyl-, ethyl-, propyl-, butyl-, phenyl-, p-methylphenyl- or benzylphosphonate, carboxylates derived from a $C_1$–$C_8$carboxylic acid, for example formate, acetate, propionate, butyrate, benzoate, phenylacetate, mono-, di- or trichloro- or -fluoroacetate, and also $C_1$–$C_{12}$-alcoholates, such as straight chain or branched $C_1$–$C_{12}$-alcoholates, e.g. methanolate or ethanolate.

Anionic ligands and neutral may also be present up to the preferred coordination number of the complex cation, especially four, five or six. Additional negative charges are counterbalanced by cations, especially monovalent cations such as $Na^+$, $K^+$, $NH_4^+$ or $(C_1$–$C_4alkyl)_4N^+$.

Suitable neutral ligands are inorganic or organic neutral ligands commonly known in complex chemistry of transition metals. They coordinate to the metal ion through a σ-, π-, μ, η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i$-$C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine ($Me_8TREN$), catechol, N,N'-dimethyl-1,2-benzenediamine, 2-(methylamino)phenol, 3-(methylamino)-2-butanol or N,N'-bis(1,1-dimethylethyl)-1,2-ethanediamine, N,N,N',N'',N''-pentamethyldiethylenetriamine (PMDETA), $C_1$–$C_8$-glycols or glycerides, e.g. ethylene or propylene glycol or derivatives thereof, e.g. di-, tri- or tetraglyme, and monodentate or bidentate heterocyclic $e^-$ donor ligands.

Heterocyclic $e^-$ donor ligands are derived, for example, from unsubstituted or substituted heteroarenes from the group consisting of furan, thiophene, pyrrole, pyridine, bis-pyridine, picolylimine, γ-pyran, γ-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, isoquinoline, bis-isoquinoline, acridine, chromene, phenazine, phenoxazine, phenothiazine, triazine, thianthrene, purine, bis-imidazole and bis-oxazole.

The oxidisable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, $Me_6TREN$ or PMDETA.

The transition metal in the oxidisable transition metal complex catalyst salt is converted from its lower oxidation state in the above-mentioned redox systems to its higher oxidation state. In a preferred embodiment of the process a Cu(I) complex catalyst salt is converted to the corresponding Cu(II) oxidation state.

Because the present polymerization by ATRP is a "living" polymerization, it can be started and terminated practically at will. The copolymers (IV) as obtained by the process and the subsequent macromonomer (II) have a low polydispersity. Preferably the polydispersity is from 1.01 to 2.2, more preferably from 1.01 to 1.9, and most preferably from 1.01 to 1.5.

The various advantages of the process of this type allowing flexible polymerization reactions are described by K. Matyjaszewski in ACS Symp. Ser. Vol. 685 (1998), pg. 2–30.

The elimination of the transfer group —Y, e.g. halogen, with the polymerizable chain terminal group —X is advantageously performed in such a way that the polymerisate is dissolved in a solvent and the monomeric compound corresponding to —X is added in the presence of a non-nucleophilic base such as diazabicycloundecene (DBU) or other bases at higher temperatures. The reaction, which is a conventional esterification reaction, takes place under the conditions of a regular esterification reaction within a temperature range from room temperature to the boiling temperature of the reaction mixture, preferably from room temperature to 100° C.

The following Examples illustrate the invention without limiting the scope thereof:

A) SYNTHESIS EXAMPLES

Example 1

1.1 Preparation of a Macromonomer:

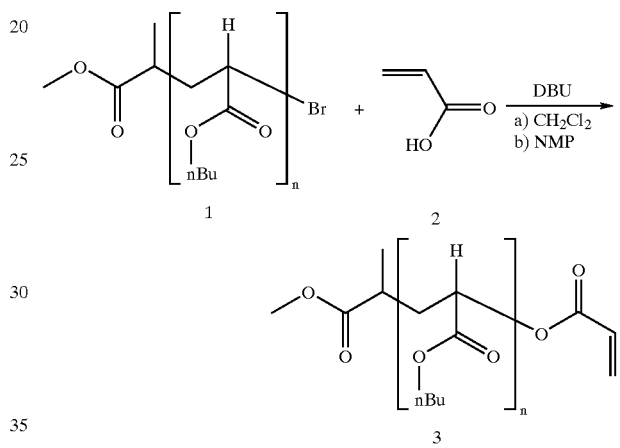

1 is a polymer prepared by the ATRP method from n-butyl acrylate according to Example 1.2: $M_n$: 1300, $M_w$: 1560, PDI: 1.52; Br-content: 5.31%.

5.0 g (3.32 mmol polymer with terminal —Br) 1 are dissolved in 5 ml methylene chloride in a 25 ml round flask equipped with a magnetic stirrer. 0.72 g (10.0 mmol) acrylic acid (Fluka Switzerland, purum) and 1.52 g (10 mmol) 1,8-diazabicylo[5.4.0]undec-7-ene (DBU) are added thereto. A slightly exothermic reaction is observed. The reaction mixture is stirred for 20 hours at room temperature, evaporated, dissolved in ethyl acetate, washed with water and a saturated aqueous sodium chloride solution. After drying over magnesium sulphate and filtration the organic phase is evaporated in the rotary evaporator and dried for one hour at 100° C. in the vacuum. A colourless, viscous liquid 3 is obtained. Yield: 3.6 g (72%). Analytical data:

|  | C | H | Br |
|---|---|---|---|
| calc. | 64.43 | 9.23 | 0.00 |
| found | 63.05 | 9.06 | <0.3 |

GPC (THF, PS-Standards): $M_n$: 1380, $M_w$: 1670, PDI=1.21.

1.1.1 The macromonomer 3 is obtained in a manner analogous to Example 1.1 with N-methyl-2-pyrrolidone (NMP) as solvent. Yield: 4.2 g (84%). Analytical data:

|  | C | H | Br |
|---|---|---|---|
| calc. | 64.43 | 9.23 | 0.00 |
| found | 63.72 | 9.10 | <0.3 |

GPC (THF, PS-Standards): $M_n$: 1420, $M_w$: 1760, PDI=1.23.

1.1.2 In a manner analogous to Example 1.1 a macromonomer analogous to 3 is obtained with NMP as solvent. Feed: 75.77 g (18.3 mmol) homopolymer n-butyl acrylate with terminal —Br as prepared by the method according to Example 1.2; 3.95 g (54.9 mmol) acrylic acid; 8.35 g (54.9 mmol) DBU; 50 ml NMP.

The reaction mixture is stirred at room temperature for 19 hours and diluted with 100 ml ethyl acetate. The product is obtained after phase separation with water and a saturated aqueous sodium chloride solution and drying at 90° C. in the vacuum. Yield: 64.6 g (85%); GPC (THF, PS-Standards): $M_n$: 3900, $M_w$: 5330; PDI=1.36.

1.1.3 The macromonomer 3 is obtained in a manner analogous to Example 1.1.1 on a kg-scale. 555 g (0.186 mol polymer with terminal —Br) 1 (poly-n-n-butyl acrylate synthesised according to Example 1.2 ($M_n$: 2770, $M_w$: 3950, PDI=1.43, Br-content 2.68%) are diluted with 350 ml NMP. 40.2 g (38.3 ml, 0.558 mol) acrylic acid are added followed by the addition of 84.95 g (83.1 ml, 0.558 mol) DBU. A slightly exothermic (40° C.) reaction is observed. The reaction mixture is diluted with 500 ml ethyl acetate and 200 g $SiO_2$ are added. After filtration and extraction (3×) with aqueous sodium chloride solution (25%), the organic phase is dried over $Na_2SO_4$, and filtered. The solvent phase is evaporated in the rotary evaporator, first at 60° C. (p=100 mbar) then for 1 h at 100° C. (p<0.1 mbar). Yield: 506 g (91%). Analytical data:

|  | C | H | Br |
|---|---|---|---|
| calc. | 64.91 | 9.27 | 0.00 |
| found | 64.70 | 8.94 | 0.55 |

GPC (THF, PS-standards): $M_n$: 3070, $M_w$: 4340, PDI=1.41; GPC (DMF, PS-standards): $M_n$: 5150, $M_w$: 6070, PDI=1.18; MALDI-TOF-MS: $M_n$: 2180, $M_w$: 2790, PDI=1.28; Double bond analysis (titration with mercaptan): 0.35 meq./g (calc.), 0.32 meq./g (found): Cu-content: <10 mg/kg.

1.2 Preparation of the Homopolymer n-butyl Acrylate with Terminal —Br by the ATRP Method ([M]:[I]:[CuBr]:[L]= 30:1:0.2:0.4):

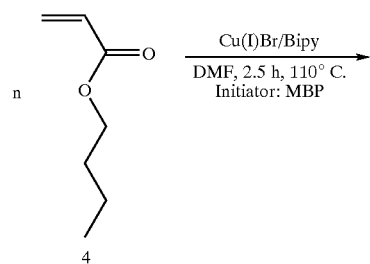

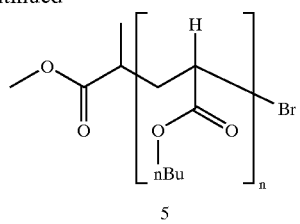

0.75 g (5.2 mmol) CuBr (Fluka, purum, purified by washing with acetic acid) and 1.62 g (10.4 mmol) of the ligand former 2,2'-bipyridyl (Fluka, puriss. p.a.) are added to a 250 ml round flask equipped with a magnetic stirrer. The air is removed from the flask by evacuating and rinsing three times with nitrogen. 100.0 g(111.3 ml. 0.78 mol) n-butyl acrylate (BASF, purum) and 11.1 ml DMF (Fluka, puriss p.a.) are added. The air is removed again from the flask by evacuating and rinsing three times with nitrogen. The reaction mixture is heated to 80° C. under stirring. 4.34 g (2.9 ml, 26 mmol) methyl-2-brom-propionate (MBP, initiator) are added and the reaction mixture is heated up to 110° C. This initiates an exothermic polymerisation reaction. By removing the oil bath the temperature rises up to 118° C. The amount produced is determined by $^1$H-NMR-analysis in $CDCl_3$ (90% after 150 Min.). After cooling to room temperature the reaction mixture is diluted with 100 ml ethyl acetate and filtered. 20 g neutral aluminium oxide (ALOX for chromatography, Merck) are added. After stirring the mixture for 30 minutes at room temperature, filtration and complete drying in the rotary evaporator at 100° C. a colourless, viscous liquid is obtained.

Yield: 93.5 g (89%). Analytical data:

|  | C | H | Br |
|---|---|---|---|
| calc. | 63.90 | 9.20 | 2.20 |
| found | 64.10 | 9.10 | 1.93 |

GPC (THF): $M_n$: 3780, $M_w$: 5130, PDI: 1.36.

Example 2

Preparation of a Macromonomer:

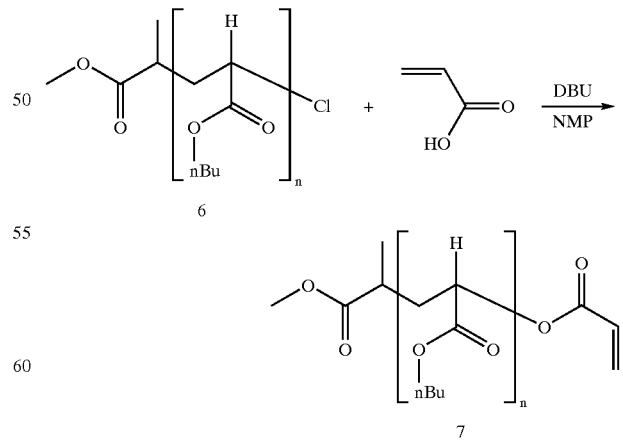

6 is a polymer prepared by the ATRP method from n-butyl acrylate according to Example 1.2: $M_n$: 1490; PDI:1.87; Cl-content: 1.92%.

10.0 g (5.40 mmol polymer with terminal —Cl) 6 are dissolved in 10 ml NMP (Fluka, purum) in a 100 ml round flask equipped with a magnetic stirrer. 1.17 g (16.2 mmol) acrylic acid (Fluka, purum) and 2.47 g (16.2 mmol) DBU are added thereto. A slightly exothermic reaction is observed. The opaque reaction mixture is stirred for 15 hours at room temperature, evaporated, dissolved in ethyl acetate and washed with water and a saturated aqueous sodium chloride solution. After drying over magnesium sulphate and filtration the organic phase is evaporated in the rotary evaporator and dried for one hour at 100° C. in the vacuum. A colourless, viscous liquid 7 is obtained. Yield: 5.88 g (53%). Analytical data:

|  | C | H | Cl |
|---|---|---|---|
| calc. | 64.22 | 9.09 | 0.00 |
| found | 63.73 | 8.95 | 0.60 |

GPC (THF, PS-Standards): $M_n$: 2000, $M_w$: 4020, PDI=2.01.

Example 3

3.1 Synthesis of a Macromonomer in a One Pot Procedure with Methacrylate as the Terminal Group:

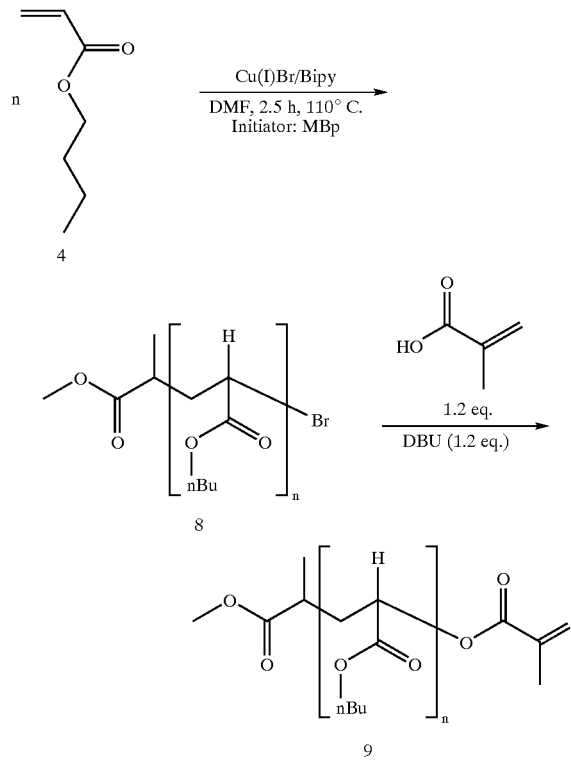

11.93 g (0.0832 mol) Cu(I)Br is added into a 2.5 l reaction vessel (evacuated and rinsed with $N_2$ 3 times) followed by the addition of 800 g (6.24 mol) n-butyl acrylate 4 and 25.92 g (0.166 mol) bipyridin dissolved in 90 ml DMF. The mixture is homogenised by stirring and heating to 90° C. The initiator, 34.73 g (0.208 mol) methyl-2-bromopropionate, is added and the mixture heated to 110° C. for two and a half hours. A conversion to 8 of 74% is monitored in the $^1$H-NMR. The mixture is diluted with 400 ml ethylacetate and filtered. 21.52 g (0.25 mol, 1.2 eq.) methacrylic acid and 38.06 g (0.25 mol. 1.2 eq.) DBU are added and the reaction mixture is stirred at room temperature for 19 h. The reaction mixture is filtered and 200 g $SiO_2$ are added. The reaction mixture Is filtered again and the solvents are evaporated in the rotary evaporator. The macromonomer 9 is dried at 100° C. in the high vacuum (p<0.1 mbar). Yield: 605.1 g (96.5%) slighty orange transparent viscous liquid. Analytical data:

|  | C | H | Br |
|---|---|---|---|
| calc. | 65.04 | 9.30 | 0.00 |
| found | 64.80 | 9.10 | <0.3 |

GPC (THF, PS-standards): $M_n$: 3440, PDI=1.36; GPC (DMF, PS-standards): $M_n$: 5270, $M_w$: 6070, PDI=1.17; MALDI-TOF-MS: $M_n$: 2640, $M_w$: 3200, PDI=1.21; double bond analysis (titration with mercaptan): 0.30 meq./g (calc.), 0.29 meq./g (found); Cu-content: <10 mg/kg.

3.2 Alternative Synthesis of a Macromonomer in a One Pot Procedure with Methacrylate as the Terminal Group:

7.46 g (0.052 mol) Cu(I)Br is added into a 2.5 l reaction vessel (evacuated and rinsed with $N_2$ 5 times) followed by the addition of 1000 g (7.80 mol) n-butyl acrylate and 350 ml acetone. The reaction mixture Is homogenised by mechanical stirring. 9.0 g (0.052 mol) PMDETA are added with a syringe and a green solution is obtained. After adding 43.43 g (0.26 mol) methyl-2-bromopropionate as the initiator, the mixture is heated to 60° C. The highly exothermic reaction requires cooling with ice to maintain the temperature at about 60° C. for 4 h. A conversion of 74% is monitored in the $^1$H-NMR. The reaction mixture is cooled to room temperature and the solvents are evaporated in the rotary evaporator. After diluting the residue with 300 ml ethylacetate 2×150 g $SiO_2$ are added. The mixture is filtered and directly converted to the macromonomer.

26.86 g (0.31 mol, 1.2 eq.) methacrylic acid and 47.51 g (0.31 mol, 1.2 eq.) DBU are added to the reaction mixture which is then stirred at room temperature for 15 hours. After filtration 200 g $SiO_2$ are added. The reaction mixture is stirred for a half hour and filtered again. The solvents are evaporated in the rotary evaporator and the macromonomer dried at 100° C. in high vacuum (p<0.1 mbar). Yield: 803.3 g (97.5%) of a slightly yellow transparent viscous liquid. Analytical data:

|  | C | H | Br |
|---|---|---|---|
| calc. | 65.06 | 9.30 | 0.00 |
| found | 64.79 | 9.68 | <0.3 |

GPC (THF, PS-standards); $M_n$: 3960, PDI=1.14; double bond analysis (titration with mercaptan): 0.25 meq./g (calc.), 0.23 meq./g (found); Cu-content: <10 mg/kg.

3.3 In a Manner Analogous to Example 3.2 a poly(n-butylacrylate) Macromonomer with Methacrylate as the Terminal Group is Synthesised by ATRP of n-butyl Acrylate with Cu(I)Br/PMDETA. Analytical Data:

|  | C | H | Br |
|---|---|---|---|
| calc. | 65.05 | 9.30 | 0.00 |
| found | 64.76 | 9.26 | <0.3 |

Double bond analysis (titration with mercaptan): 0.30 meq./g (calc.), 0.29 meq./g (found); Cu-content: <4.0 mg/kg.

3.4 Alternative Synthesis of a Macromonomer in a One Pot Procedure with Methacrylate as the Terminal Group: Addition of Cu(II)Br$_2$ to control the reaction:

2.44 g (0.017 mol) Cu(I)Br and 0.67 g (0.003 mol, 20% of Cu(I)) Cu(II)Br$_2$ are added to a 750 ml reaction vessel (evacuated and rinsed with N$_2$ 5 times) followed by the addition of 128.1 g (1.00 mol) n-butyl acrylate and 32 g acetone. The reaction vessel is again four times evacuated and rinsed with N$_2$. After adding 3.46 g (0.02 mol) PMDETA the mixture is homogenised by mechanical stirring. After adding 16.7 g (0.10 mol) methyl-2-bromo-propionate as initiator, the mixture is preheated to 63° C. in an oil bath. This starts an exothermic reaction and the temperature is maintained at 58–65° C. by cooling with ice. A conversion of 68% after 60 min. and 80% after 90 min. is observed by $^1$H-NMR methods. The reaction is terminated after 90 min. by cooling to room temperature and exposure to air. The Cu(I)/Cu(II)-complex catalysts are removed by filtration. After adding a small volume of ethylacetate and 50 g SiO$_2$ the mixture is filtered again.

10.33 g (0.12 mol, 1.2 eq.) methacrylic acid and 18.27 g (0.12 mol, 1.2 eq.) DBU are added to the reaction mixture which is then stirred at room temperature for 20 hours. After filtering off the white precipitate (DBU.HBr) formed 50 g SiO$_2$ are added. The reaction mixture is stirred for a half hour and filtered again. The solvents are evaporated in the rotary evaporator and the macromonomer is dried for 45 min. at 90° C. in high vacuum (p<0.1 mbar). Yield: 116.9 g (98%) of a slightly yellow transparent viscous liquid. Analytical data:

|       | C     | H    | Br    |
|-------|-------|------|-------|
| calc. | 64.19 | 9.09 | 0.00  |
| found | 64.56 | 8.74 | <0.30 |

GPC (THF, PS-standards): $M_n$: 1390, PDI=1.15; double bond analysis: 0.72 meq./g (calc.); 0.75 meq./g (found).

3.5 Alternative Synthesis of a Macromonomer of Higher Molecular Weight in a One Pot Procedure with Methacrylate as the Terminal Group:

Feed: 0.71 g (0.005 mol) Cu(I)Br; 128.1 g (1.0 mol) n-n-butyl acrylate; 32 g acetone, 0.87 g (0.005 mol) PMDETA; 1.67 g methyl-2-bromopropionate; 1.03 g (0.012 mol, 1.2 eq.) methacrylic acid and 1.83 g (0.012 mol, 1.2 eq.) DBU.

The reaction is performed in a manner analogous to the process according to Examples 3.1–3.3. Yield: 100.0 g (98%) of a slightly yellow transparent viscous liquid. Analytical data:

|       | C     | H    | Br    |
|-------|-------|------|-------|
| calc. | 65.34 | 9.66 | 0.00  |
| found | 65.42 | 9.09 | <0.30 |

GPC (THF, PS-standards): $M_n$: 10700, PDI=1.08; double bond analysis: 0.093 meq./g (calc.), 0.091 meq./g (found).

Example 4

Synthesis of a Macromonomer in a One Pot Procedure with Methacrylate as the Terminal Group from Polydimethylaminoethyl Acrylate (poly DMAEA):

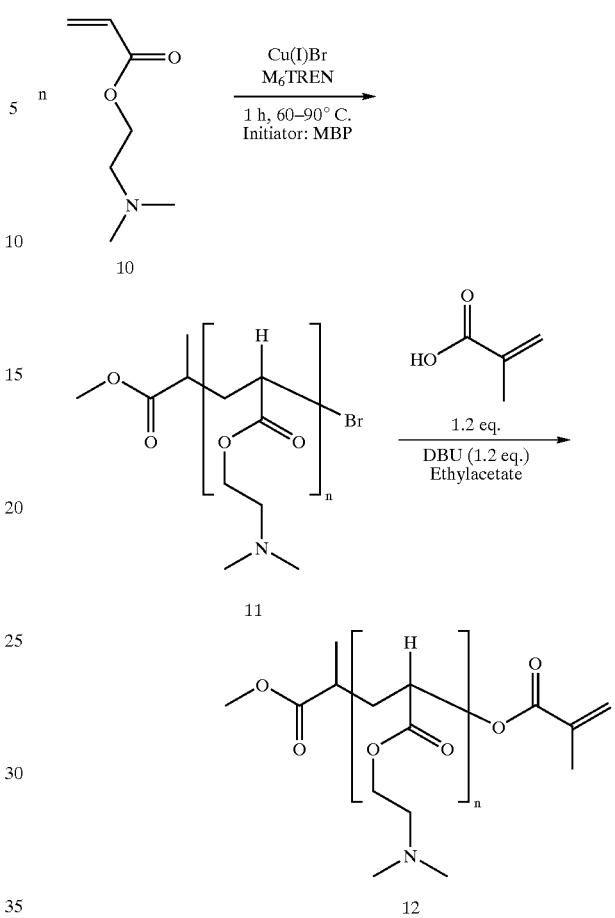

0.43 g (0.003 mol) Cu(I)Br are added to a 50 ml 3-necked flask (evacuated and rinsed with N$_2$ 3 times) followed by the addition of 28.63 g (0.20 mol) 2-dimethylaminoethyl acrylate (DMAEA) 10. The reaction vessel is again evacuated and rinsed with N$_2$ 4 times. The reaction mixture is homogenised by mechanical stirring followed by the addition of 0.69 g (0.001 mol) Me$_6$TREN with a syringe and the addition of 1.67 g (0.010 mol) methyl-2-bromo-propionate as the initiator. The mixture is heated to 63° C. in an oil bath. The highly exothermic reaction requires cooling with ice to maintain the temperature at about 58–65° C. for 1 h. The reaction mixture is cooled to room temperature, diluted with 20 ml ethyl acetate and filtered. After adding 14 g A$_2$O$_3$ the mixture is filtered again.

1.03 g (0.012 mol, 1.2 eq.) methacrylic acid, 1.83 g (0.012 mol, 1.2 eq.) DBU and 30 ml ethyl acetate are added to the reaction mixture containing 11 which Is then stirred at room temperature for 20 hours. After filtering off the white precipitate (DBU.HCl) formed 14 g SiO$_2$ are added. The reaction mixture is stirred for a half hour and filtered again. The solvents are evaporated in the rotary evaporator and the macromonomer 12 dried for 60 min. at 100° C. in high vacuum (p<0.1 mbar). Yield: 12.41 g (41.0%) of a slightly yellow transparent viscous liquid 12. Analytical data:

|       | C     | H    | N    | Br    |
|-------|-------|------|------|-------|
| calc. | 58.29 | 8.93 | 9.02 | 0.00  |
| found | 57.64 | 9.25 | 8.90 | <0.3  |

GPC (THF, PS-standards): $M_n$: 1780, PDI=1.27.

Example 5
Synthesis of Star Shaped Macromonomers:
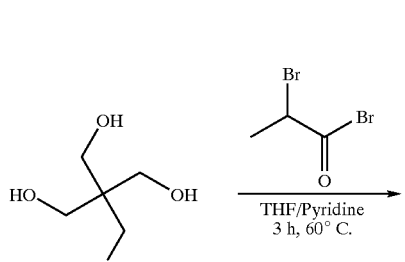
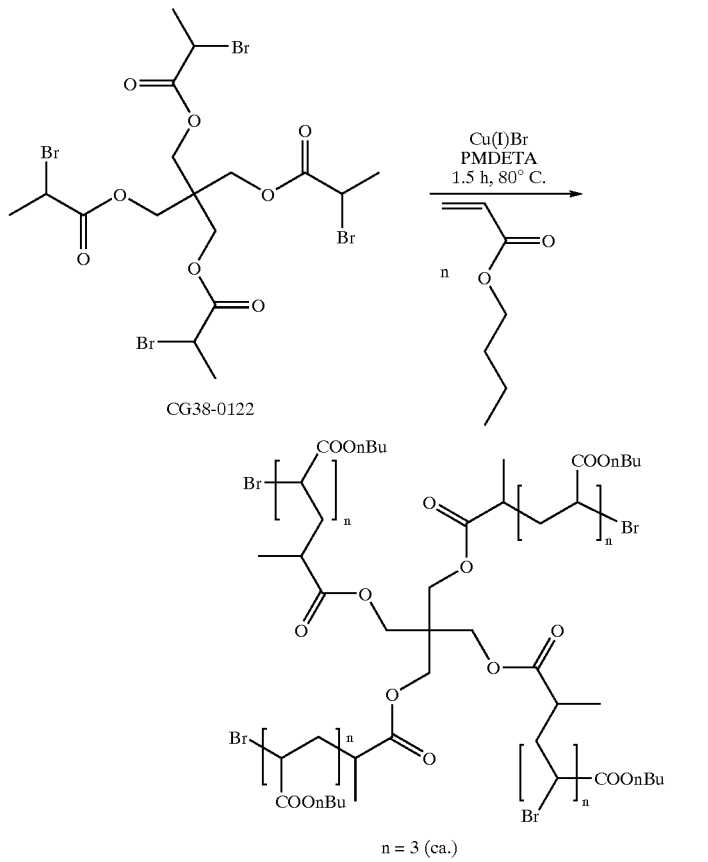
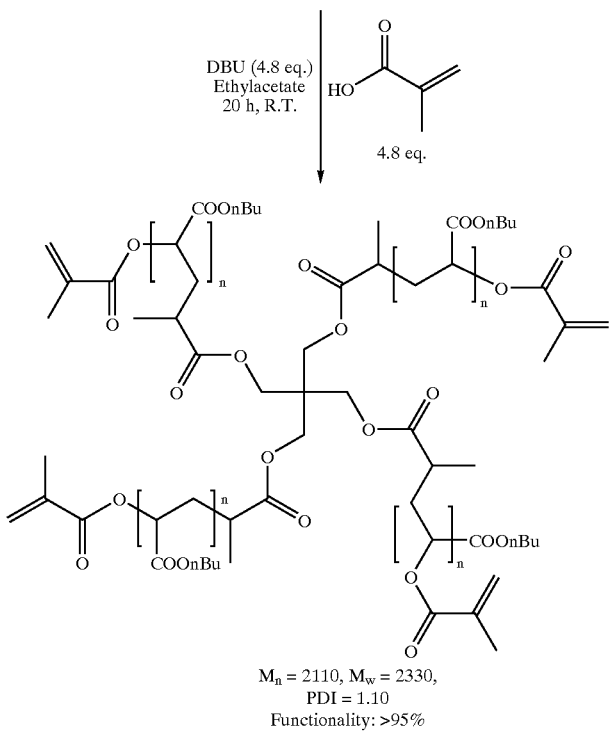
$M_n = 2110$, $M_w = 2330$,
PDI = 1.10
Functionality: >95%

27.2 g (0.2 mol) pentaerythritol and 63.2 g (0.80 mol) pyridine suspended in 250 ml THF are stirred in a 1500 ml round bottom flask (rinsed with $N_2$). 181.7 g (0.80 mol) 2-bromo-propionyl bromide dissolved in 250 ml THF are added dropwise at 10–15° C. The mixture is stirred at 60° C. for 3 h in an oil bath. After cooling to room temperature the mixture is filtered and dried over $Na_2SO_4$. After filtering and evaporating the solvents in the rotary evaporator 150 g crude product 13 are obtained which are purified by recrystallisation from isopropanol. Yield: 35.48 g (26%) white crystals; M.p.: 94.6° C. (DSC); Analytical Data:

|       | C     | H    | Br    |
|-------|-------|------|-------|
| calc. | 30.21 | 3.58 | 47.30 |
| found | 30.70 | 3.61 | 45.28 |

028 g (0.002 mol) Cu(I)Br and 15.38 g (0.12 mol) n-butyl acrylate are added to a 50 ml 3-necked flask (evacuated and rinsed with $N_2$ four times). After adding 0.35 g (0.002 mol) PMDETA via a syringe the mixture is homogenised by magnetic stirring. 6.76 g
(0.010 mol) of the star type initiator 13 obtained according to Example 5.1, dissolved in 15.4 g degassed dioxane, are added at 50° C. The mixture is heated In an oil bath to 80° C. for one and a half hours. A conversion to about 100% is monitored by $^1$H-NMR. The mixture is cooled to room temperature, diluted with 30 ml dioxane and filtered. 30 g $Al_2O_3$ are added and the mixture is filtered again. Yield: 19.8 g (90%) transparent liquid 14; Analytical data:

|       | C     | H    | Br    |
|-------|-------|------|-------|
| calc. | 54.79 | 7.65 | 14.44 |
| found | 55.29 | 7.58 | 13.26 |

GPC (THF, PS-standards): $M_n$=1770, PDI=1.27; $M_n$ (calc.)=2210; MALDI-TOF-MS: $M_n$=1920; PDI=1.09.
5.3
2.0 g of the star shaped poly(n-n-butyl acrylate) 14 with terminal Br-groups obtained by the method according to Example 5.2 are dissolved in 10 ml ethyl acetate. 0.342 g (0.004 mol, 1.2 eq.) methacrylic acid and 0.61 g (0.012 mol, 1.2 eq.) DBU are added to the mixture which is stirred at room temperature for 20 h. After filtering the yellow suspension containing DBU.HBr 2.5 g $SiO_2$ are added. After stirring for a half hour and filtering the solvents are evaporated in the rotary evaporator. The macromonomer 15 is dried for 1 h at 100° C. in high vacuum (p<0.1 mbar). Yield: 2.11 g (90%) transparent liquid; GPC (THF, PS-standards): $M_n$: 2110, PDI=1.10; double bond titration: 1.79 meq./g (calc.), 1.80 meq./g (found).

Example 6

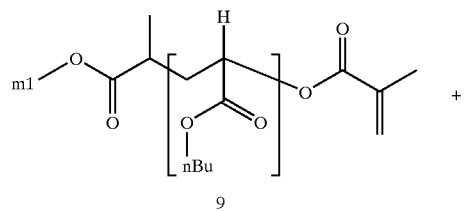

9

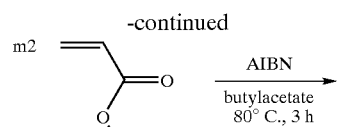

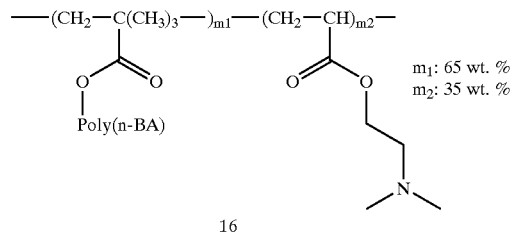

10
Comb Copolymer

16

6.1 Preparation of Comb Copolymers from Macromonomers and DMAEA
6.1.1
200 g (0.0581 mol, 65 wt %) of the macromonomer 9, obtained by the method according to Example 3.1, 107.7 g (0.752 mol, 35 wt %) N,N-dimethylaminoethyl acrylate (DMAEA) 10, 233 ml n-butyl acetate and 9.33 g (0.0562 mol, 3 wt %, relative to the monomers) AIBN, are introduced into a 1.5 l reactor (evacuated and rinsed 3 times with $N_2$). The homogeneous mixture is polymerised at 80° C. (exothermic reaction up to 90° C.) during 3 h. The mixture containing 16 is directly used for tests as a pigment dispersant. Analytical data of dried sample:

|       | C     | H    | N    |
|-------|-------|------|------|
| calc. | 62.83 | 9.21 | 3.71 |
| found | 62.53 | 8.86 | 3.54 |

GPC (THF, PS-standards): $M_n$=10300, PDI=3.6.
6.1.2.
400 g (0.129 mol) of the macromonomer 9, obtained by the method according to Example 3.2, 112.8 g (0.717 mol) N,N-dimethylaminoethyl methacrylate (DMAEMA, Ageflex®FM1), 1303 g (148 ml) and 217.2 g (246.8 ml) n-butyl acetate and 10.25 g (62.4 mmol) AIBN
The macromonomer is introduced into a 1.5 l reaction vessel equipped with mechanical stirring and vacuum/$N_2$ Inlet/outlet. After rinsing with $N_2$ AIBN is dissolved in DMAEMA. 148 ml n-butylacetate are added and the mixture is homogenised by stirring. The clear solution is evacuated and rinsed with $N_2$ four times to remove the oxygen. The reaction mixture is heated in an oil bath to 60° C. for 24 hours. The monomer and macromonomer conversion, as observed by $^1$H-NMR spectroscopy, is almost quantitative. After adding 246.8 ml n-butyl acetate the mixture is homogenised by stirring at 60° C. in air. A small sample is completely dried for obtaining the analytical data. Analytical data of dried sample:

|  | C | H | N |
|---|---|---|---|
| calc. | 64.25 | 9.37 | 2.12 |
| found | 63.79 | 9.30 | 2.05 |

GPC (THF, RI-det.): $M_n$=72700, $M_w$=262000, PDI=3.6

6.2 Quaternisation of Nitrogen in a Comb Copolymer.

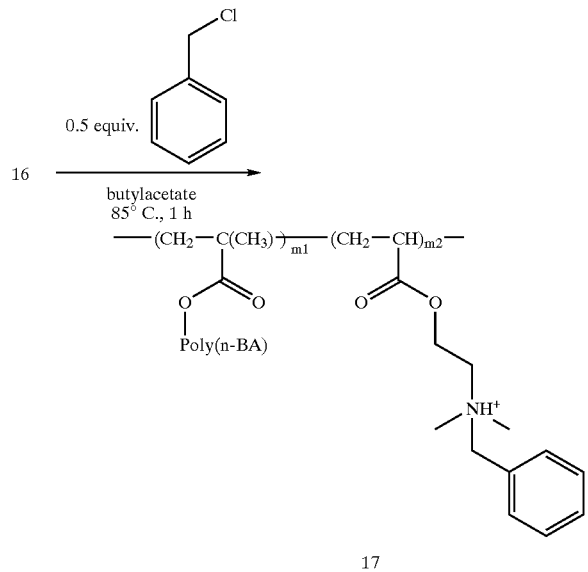

166.6 g of a 60% solution of the amphiphilic comb copolymer 16 in n-butylacetate and a solution of 15.95 g (0.126 mol) benzylchloride in 12.15 ml butylacetate is charged into a 350 ml flask with mechanical stirring. The mixture is heated 1 h at 80° C. in an oil bath. After cooling to room temperature the clear, viscous solution is used for further processing. Yield: 160 g; degree of quaternisation: 50%.

6.3 Formation of an Acid Addition Salt

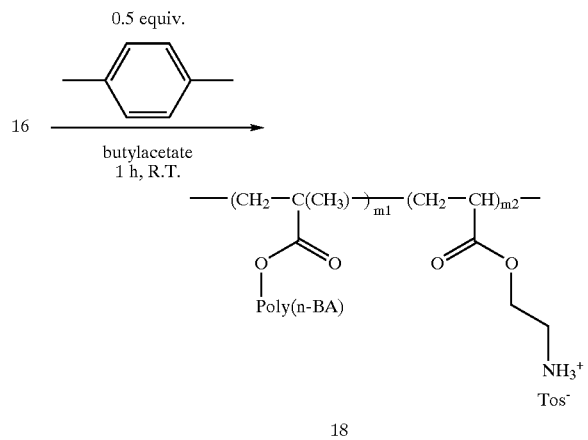

166.6 g of a 60% solution of the amphiphilic comb copolymer 16 in n-butyl acetate and a solution of 23.96 g (0.126 mol) p-toluene sulfonic acid in 16 g butyl acetate is charged into a 350 ml flask with mechanical stirring. The mixture is stirred 1 h at room temperature and then heated to 80° C. to lower the viscosity (for transfer into another flask). After cooling to room temperature the clear, viscous solution is used for further processing. Yield: 195.7 g; degree of neutralisation: 50%.

Example 7

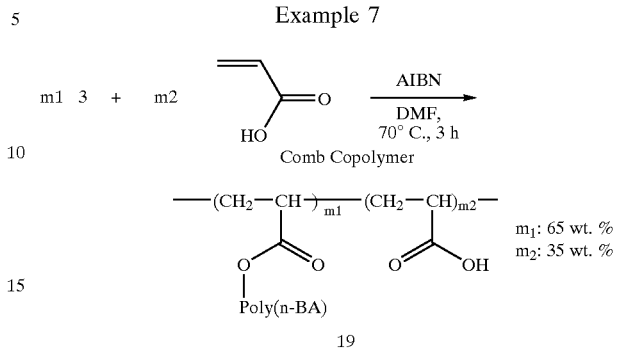

Feed: 0.66 g (0.46 mmol) macromonomer 3 obtained by the method according to Example 1.1; 0.35 g (4.9 mmol) acrylic acid; 30 mg (3 wt %) AIBN; 1.0 g DMF (Fluka puriss p.a.).

The reagents are mixed in 25 ml round bottomed flask equipped with a magnetic stirrer and $N_2$/vacuum connection. The flask is evacuated and rinsed with $N_2$ about ten times. The flask is heated to 60° C. for 1 h under stirring and to 70° C. for 2 h. The analysis by $^1$H-NMR shows a complete reaction by disappearance of the double bonds. The solvent is removed in the rotary evaporator (1 h, 100° C.). Yield: 1.0 g of a white, elastic polymer 19. DSC: $T_g(1)$: −48° C. (Poly(n-BA); $T_g(2)$: 47° C. (Poly(n-BA-co-AA)); GPC (DMF, PS-Standards): $M_n$:14 millions; PDI=1.15I (formation of micells).

Example 8

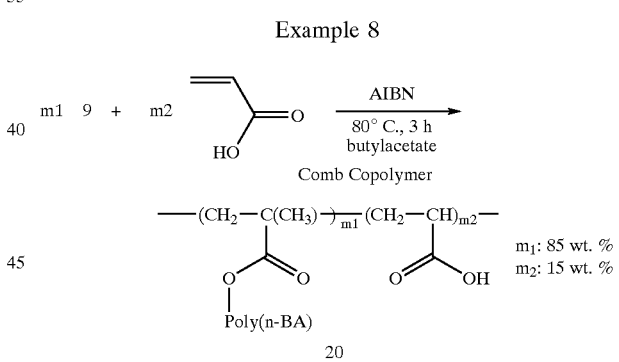

Feed: 197.7 g (57.5 mmol) macromonomer with terminal acrylate group obtained by the method according to Example 3.1; 34.9 g (0.484 mol) acrylic acid; 150 mg (3 wt %) AIBN; 159.3 g butyl acetate (Fluka purum).

The process is carried out in a manner analogous to Example 7 at a temperature of 80° C. Analytical Data:

|  | C | H |
|---|---|---|
| calc. | 62.81 | 8.69 |
| found | 62.47 | 9.08 |

GPC (DMF, PS-Standards): $M_n$: 3.4 mio., PDI=9.8; acid value determined by titration: found 0.98 meq./g (calc.), 1.25 meq./g.

Example 8.1

Partially Neutralised (50%) Amphiphilic Comb Copolymer of Example 8 with tris-2(-ethylhexylamine)

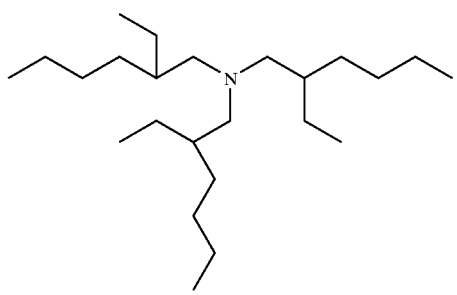

116.6 g comb polymer of Example 8 (60 wt % solution in butylacetate); 20.2 g tris-2(-ethylhexylamine) (Fluka, purum);

13.47 g butylacetate (Fluka, purum);

The reagents are mixed and homogenised during 1 h at room temperature. The mixture is used for synthesis without further purification. Degree of neutralisation: 50%.

Example 9

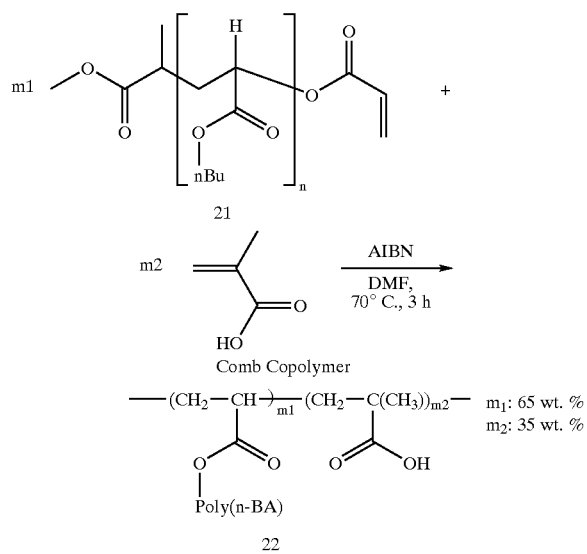

Feed: 3.25 g (0.83 mmol) macromonomer 21 with terminal acrylate group obtained by the method according to Example 1.12; 1.75 g (20.3 mmol) methacrylic acid (Fluka, purum); 0.15 g (3.0 wt %) AIBN; 5.0 g DMF.

The reagents are mixed in a 25 ml round bottomed flask equipped with a magnetic stirrer and $N_2$/vacuum inlet. The flask is evacuated and rinsed with $N_2$ about ten times. The flask is heated to 70° C. for 3 h. A viscous liquid is obtained. The polymer is precipitated in water and dried over night at 50° C. in a vacuum. Yield: 4.8 g of the white, elastic polymer 22.

Example 10

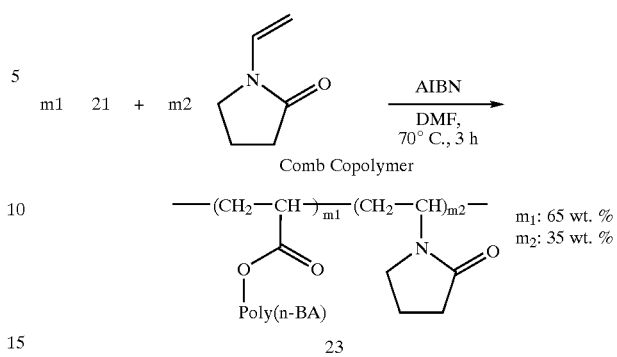

Feed 3.25 g (0.83 mmol) macromonomer 21 with the terminal acrylate group obtained by the method according to Example 1.1.2; 1.75 g (15.1 mmol) 1-vinyl-2-pyrrolidone (Fluka, pract); 0.15 g (3 wt %) AIBN; 5.0 g DMF.

The reagents are mixed in a 25 ml round bottomed flask equipped with a magnetic stirrer and $N_2$/vacuum inlet. The flask is evacuated and rinsed with $N_2$ about ten times. The flask is heated to 70° C. for 3 h. A viscous liquid is obtained. The polymer is obtained by removing the solvent in then vacuum in a rotary evaporator (1 h, 100° C.). Yield: 5.0 g (100%) of a white, elastic polymer 23.

Example 11

Formation of a copolymer between a macromonomer with methacrylate end groups according to Example 3.2 (85 wt %), and N,N-dimethylacrylamide:

Feed: 100.0 g macromonomer, example 32; 17.64 g N,N-dimethylacrylamide (15 wt %); 3.53 g AIBN (3 wt %); 80.8 g n-butyl acetate.

The polymerization is performed in a manner analogous to Example 7 (3 h, 80° C.). 100% conversion. Yield: quantitative. Analytical data:

|  | C | H | N |
|---|---|---|---|
| calc. | 64.49 | 9.62 | 2.50 |
| found | 62.98 | 8.55 | 2.18 |

GPC (DMF, PS standards): $M_n$: 104000, PDI=4.3; Intrinsic viscosity (THF): [η]: 0.23 dl/g; Light scattering: radius of gyration (ca. micellar radius): 21 nm (THF), 27 nm (DMF).

Example 12

Formation of a copolymer between the macromonomer of Example 3.2 (85 wt %) and a mixture of N,N-dimethylacrylamide (15 wt %) and 2-(N,N-dimethylamino)-ethylacrylate (15 wt %)

Feed: 80.0 g macromonomer 9, Example 3.1 (70 wt %); 17.15 g N,N-dimethylacrylamide (15 wt %); 17.15 g 2-(N,N-dimethylamino)-ethylacrylate (15 wt %); 3.43 g AIBN (3 wt %), 78.5 g n-butyl acetate.

The polymerization is performed in a manner analogous to Example 7 (3 h, 80° C.). 100% conversion. Yield: quantitative; Analytical data:

|       | C     | H    | N    |
|-------|-------|------|------|
| calc. | 63.69 | 9.30 | 3.91 |
| found | 61.70 | 8.69 | 3.57 |

GPC (DMF, PS standards): $M_n$: 21000, PDI=13.4; Intrinsic viscosity (THF): [η]: <0.1 dl/g; Light scattering: radius of gyration (corresponds to micellar radius): 22 nm (THF), 40 nm (DMF).

Example 13

Synthesis of a poly(N,N-dimethyl acrylamide) Macromonomer with Methacrylate end Groups:

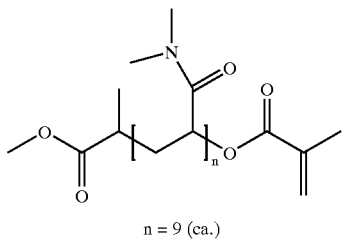

n = 9 (ca.)

Feed: 99 mg (1.0 mmol) Cu(I)Cl (Fluka, puriss p.a.); 0.69 g (3.0 mmol) Me$_6$TREN; 0.3 g (2.5 mmol) methyl-2-chloropropionate (Merck Schuchardt); 4.95 g (50 mmol) N,N-dimethyl-acrylamide (Fluka, purum); 15 ml toluene (Fluka, puriss p.a.), 0.26 g (3 mmol) methacrylic acid (Fluka, purum); 0.45 g (3 mmol) DBU (Fluka, purum)

Cu(I)Cl is added into a 25 ml reaction vessel (evacuated and rinsed with N$_2$ 5 times), followed by the addition of N,N-dimethyl-acrylamide and 15 ml toluene. The reaction mixture is evacuated and rinsed again with N$_2$ 5 times and homogenised by mechanical stirring. Me$_6$TREN is added with a syringe, and the mixture is homogenised and heated to 90° C. for 18 h. A conversion of 73% is observed in the $^1$H-NMR. The reaction mixture is cooled to room temperature and stirred over 10 g Al$_2$O$_3$ for 30 min. The mixture is filtered and directly used for the second step.

The methacrylic acid and DBU are added to the reaction mixture which is then stirred at room temperature for 24 hours. After diluting with 15 ml toluene 5 g SiO$_2$ are added. The reaction mixture is stirred for a half hour and filtered again. The solvents are evaporated in the rotary evaporator and the macromonomer dried for 1 h at 90° C. in high vacuum (p<0.1 mbar). Yield: 3.1 g (80%) of a resin. Analytical data: GPC: (THF, PS-standards): $M_n$=1240, $M_w$=1540, PDI=1.24.

Example 14

Synthesis of an Amphiphilic Block Copolymer Macromonomer with Methacrylate End Groups:

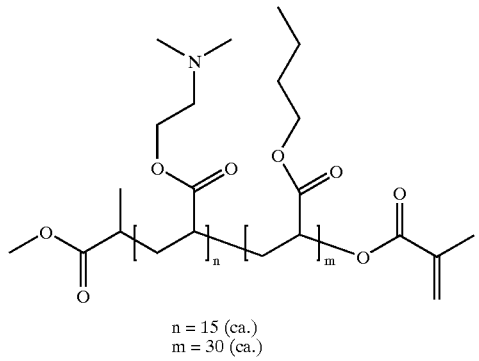

n = 15 (ca.)
m = 30 (ca.)

14.1 (First Step)

Feed: 0.43 g (3.0 mmol) Cu(I)Br (Aldrich, purified by washing with glacial acetic acid), 0.69 g (3.0 mmol) Me$_6$TREN; 1.67 g (10.0 mmol) methyl-2-bromopropionate (Fluka, purum); 28.63 g (20 mmol) N,N-dimethylaminoethyl acrylate (BASF, techn.).

The reaction is performed in a manner analogous to Ex. 3.2. Cu(I)Br is added into a 100 ml reaction vessel (evacuated and rinsed with N$_2$ 5 times) followed by the addition of N,N-dimethyl-aminoethyl acrylate. The reaction mixture is evacuated and rinsed with N$_2$ again 5 times and homogenised by mechanical stirring. Me$_6$TREN is added with a syringe. After homogenising the initiator is added. The mixture is heated to 60° C. The highly exothermic reaction requires cooling with ice to maintain the temperature at about 60° C. for 1 h. A conversion of 74% is monitored in the $^1$H-NMR. The reaction mixture is cooled to room temperature, diluted with 50 ml ethylacetate and stirred over 14 g Al$_2$O$_3$ for 30 min. The mixture is filtered and the solvents and remaining monomer distilled off in a rotary evaporator (30 min., 90° C., HV). Yield: 21.68 g (95%).

14.2 (Second Step):

Feed: 21.68 g poly(DMAEA) from above; 0.68 g (4.75 mmol) Cu(I)Br (Aldrich, purified by washing with glacial acetic acid); 0.82 g (4.75 mmol) PMDETA (Fluka, purum); 97.11 g (0.757 mol) n-butyl acrylate (BASF, techn.); 37.5 ml acetone.

The Cu(I)Br and poly(DMAEA) from the first step are added into a 350 ml reaction vessel (evacuated and rinsed with N$_2$ 5 times) followed by the addition of n-butyl acrylate and acetone. The reaction mixture is evacuated and rinsed with N$_2$ again 5 times and homogenised by mechanical stirring. PMDETA is added with a syringe and the homogenised reaction mixture is heated to 60° C. during 18 h. A conversion of 40% is monitored in the $^1$H-NMR. The reaction mixture is cooled to room temperature, diluted with 150 ml ethylacetate and stirred over 50 g Al$_2$O$_3$ for 30 min. The mixture is filtered and directly used for the third step.

14.3 (Third Step)

The filtrate from above (second step) is diluted with 150 ml ethylacetate and 1.033 g (12 mmol, 1.2 eq.) methacrylic acid. 1.82 g (12 mmol, 1.2 eq.) DBU are added to the reaction mixture which is then stirred at room temperature for 18 hours. After filtration 15 g SiO$_2$ are added. The reaction mixture is stirred for a half hour and filtered again. The solvents are evaporated in the rotary evaporator and the macromonomer dried for 1 h at 90° C. in high vacuum (p<0.1 mbar). Yield: 48 g (80%) of a slightly coloured transparent viscous liquid.

Analytical Data:
|  | C | H | N | Br |
|---|---|---|---|---|
| calc. | 62.93 | 9.27 | 3.41 | 0.00 |
| found | 62.27 | 9.01 | 2.87 | 0.33 |
GPC (THF, PS-standards): $M_n$=11200, PDI=1.23.
Example 16
Synthesis of a Trifunctional Macromonomer with Styrene End Groups:
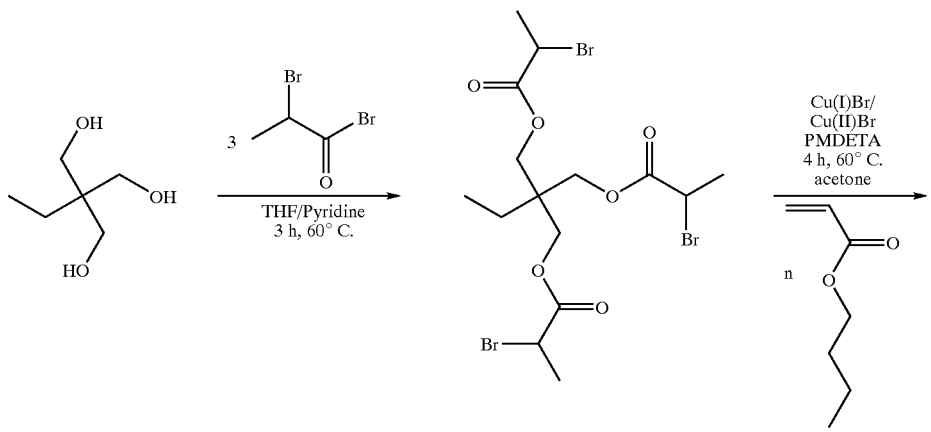
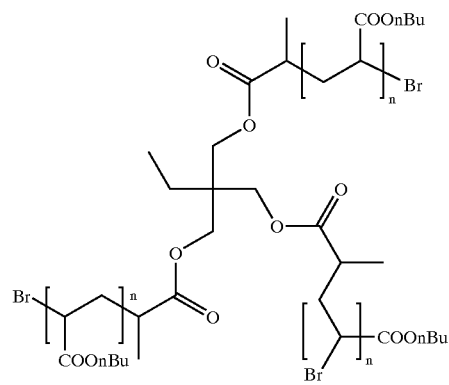
n = 4 (ca.)
$M_n$ = 2110, $M_w$ = 2400, PDI = 1.14
$M_n$ (calc.) = 2460
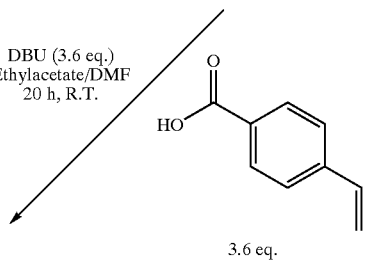

-continued

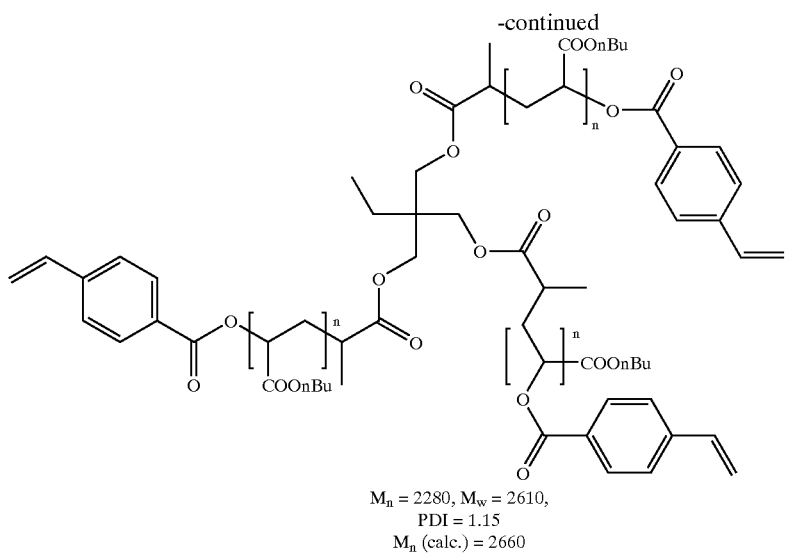

$M_n = 2280, M_w = 2610,$
$PDI = 1.15$
$M_n \text{ (calc.)} = 2660$

The initiator is prepared from trimethylol propane, 2-bromopropionyl bromide and pyridine in a manner analogous to Example. 5.1.

The polymerization of n-butyl acrylate with the initiator and the subsequent exchange of the Br-end groups by 4-vinyl-benzoic acid is performed in a manner analogous to Examples. 5.2 and 5.3.

Feed: 61 mg (0.425 mmol) Cu(I)Br (Aldrich, purified by washing with glacial acetic acid); 16.8 mg (0.075 mmol) Cu(II)Br$_2$ (Fluka, purum); 1.35 g (2.5 mmol) initiator; 4.81 g (37.5 mmol) n-butyl acrylate (BASF, techn.); 86.7 mg (0.5 mmol) PMDETA (Fluka, purum); 1.5 ml acetone; 1.33 g (9.0 mmol) 4-vinyl benzoic acid (Fluka, purum); 1.37 g (9.0 mmol) DBU (Fluka, purum); 30 ml ethyl acetate/DMF 1:1. Yield: 4.2 g (63%) viscous polymer. Analytical data:

|  | C | H | Br |
|---|---|---|---|
| calc. | 66.29 | 8.45 | 0.00 |
| found | 65.98 | 8.24 | 1.04 |

The Br-content of the precursor (before exchange of the Br-end groups with 4-vinyl benzoic acid) is 9.83% (calc.: 9.74%). Therefore, ca. 90% of the end groups are substituted and have styrene functionalities. GPC (THF; PS-standards): $M_n$: 2280, $M_w$: 2610, PDI=1.15; 1H-NMR: δ (ppm), important signals: 7.9 (d), 7.4 (d) each 2H: aromat. H; 6.65 (dxd), 5.75 (d), 5.3 (d) each 1H: olef. H of styrene unit; 5.1 (m) 1H: CH α to ester and benzoate, 3.7–4.1 (br, m) 0-CH$_2$ of butyl ester.

B) Application Examples

Example 17

17.1 Evaluation of Representative Comb Polymers as Pigment Dispersants

The performance of the different comb polymer dispersants is evaluated in millbase preparations and corresponding coating formulations made therefrom. Comparative examples with commercial dispersants demonstrate the performance of the dispersants according to the present invention for organic pigments. Results are given for the representative organic pigment Irgazin® DPP Red BO.

17.2 Testing in Coating System of type Alkyd/melamine
17.2.1 Preparation and Testing of the Millbase:

An alkyd millbase formulation is used according to the following "prescription":

| | |
|---|---|
| Alkydal F310 | 35.47 g |
| Pigment | 22.40 g |
| Silicone oil | 0.80 g |
| Dispersant (60% active) | 1.87 g |
| Xylene/1-Methoxy-2-propanol/Butanol 70/15/15 | 19.46 g |
| total: | 80.00 g |

Dependent on the active content of the different dispersants used, the "prescription" is slightly adjusted by solvents and resin in order to adjust a pigment binder ratio of 1. The components are ground for 4 hours with glass beads on a shaking machine (DIN 53238-13). The viscosity of the millbase after grinding is measured at different shear rates with a cone-plate rheometer (Paar Physica UDS 200). Good dispersant efficiency can be seen by lowering of the millbase viscosity especially at mid to low shear rates, e.g. at a shear rate of 16.

17.2.2 Preparation and Testing of a Full Shade Coating of Type Alkyd/melamine:

Full shade formulations with a pigment content of 7.4% are made from the alkyd millbase according to the following general "prescription":

| | |
|---|---|
| Millbase | 20.00 g |
| Alkydal F 310 | 24.40 g |
| Maprenal MF 650 | 14.11 g |
| Xylene/1-Methoxy-2-propanol/Butanol 70/15/15 | 17.49 g |
| total: | 76.00 g |

The fullshade formulation is drawn down on glass at 100 μm wet, dried at room temperature and than cured at 130° C. for 30 min. Gloss measurements are made on the cured coatings. High gloss is indicative for a good dispersion of the pigment in the final coating. The results of the application tests with representative comb polymer and modified comb polymers used as dispersants are reported in the Table.

Application results with IRGAZIN DPP RED BO in the coating system alkyd/melamine

TABLE

| Application Example | Dispersant Composition[1] | Dispersant Example | Dispersant Polymer [%][2] | Viscosity Millbase at Shear Rate: 1 | 16 | 128 | Full Shade Coating Gloss 20° |
|---|---|---|---|---|---|---|---|
| 1 | DISPERBYK 166[3] | | 5.0 | 2020 | 1080 | 612 | 66 |
| 2 | DISPERBYK 161[3] | | 5.0 | 4850 | 2490 | 1560 | 17 |
| 3 | EFKA 483[3] | | 5.0 | 4830 | 2390 | 1360 | 48 |
| 4 | P(BAMM-g-DMAEMA) 66 - 34 | 9 | 5.0 | 1220 | 906 | 628 | 78 |
| 5 | P(BAMM-g-DMAEMA) 66 - 34 +50% BzCl | 10 | 5.0 | 1840 | 821 | 470 | 73 |
| 6 | P(BAMM-g-DMAEMA) 66 - 34 +50% pTSA | 11 | 5.0 | 2370 | 721 | 347 | 75 |
| 7 | P(BAMM-g-DMAEMA) 85 - 15 | 14 | 5.0 | 5300 | 865 | 297 | 71 |
| 8 | P(BAMM-g-DMACM) 85 - 15 | 11 | 5.0 | 4340 | 715 | 324 | 73 |
| 9 | P[BAMM-g-(DMACM-co DMAEA)] 70 - 15 - 15 | 12 | 5.0 | 878 | 526 | 411 | 81 |
| 10 | P(BAMM-g-DMAEMA) 78 - 22 | 6.1.2 | 5.0 | 2010 | 1770 | 1700 | 83 |
| 11 | P(BAMM-g-AA) 85 - 15 +50% TEHA | 8.1 | 5.0 | 6140 | 997 | 317 | 72 |

[1] Monomer composition given in wt %
[2] Concentration: active dispersant relative to the pigment
[3] Commercial Preparations It can be seen from the examples, that compared with the commercial dispersants the comb polymers according to Examples 4 to 11 show improved gloss in the final coating and give improved rheology of the millbase. This demonstrates improved dispersant performance.

What is claimed is:

1. A comb copolymer of the formula $$\{In\text{-}[(A_x\text{-}B_y)]_p\text{-}Z\}_q \quad (I)$$

wherein

In represents the fragment of a polymerization initiator capable of initiating polymerization of ethylenically unsaturated monomers in the presence of a catalyst which activates controlled radical polymerization;

A represents an oligopolymer or polymer fragment which consists of ethylenically unsaturated repeating units of polymerizable monomers or oligopolymers;

x represents a numeral greater than one and defines the number of repeating units in A;

B represents a monomer, oligopolymer or polymer fragment copolymerized with A;

y represents zero or a numeral greater than zero and defines the number of monomer, oligopolymer or polymer repeating units in B;

Z represents a polymer backbone which consists of repeating units from polymerizable, ethylenically unsaturated monomers;

p is one or a numeral greater than one which defines the number of groups of the partial formula $$In\text{-}(A_x\text{-}B_y)\text{-} \quad (A)$$

per polymer backbone Z; and q is one or a numeral greater than one which defines the number of groups of the partial formula $$\text{-}(A_x\text{-}B_y)\text{-} \quad (B)$$

per initiator fragment In;

provided that one of p and q represents one and the other represents one or a numeral greater than one.

2. A comb polymer according to claim 1 of the formula $$[In\text{-}(A_x\text{-}B_y)]_p\text{-}Z \quad (IA),$$

wherein p is a numeral from one to hundred; and

In, A, x, B, y and Z are as defined in claim 1.

3. A comb polymer according to claim 1 of the formula $$In\text{-}[(A_x\text{-}B_y)\text{-}Z]_q \quad (IB),$$

wherein q is a numeral from one to six; and

In, A, x, B, y and Z are as defined in claim 1.

4. A comb copolymer (I) according to claim 1, wherein

In represents the fragment of a polymerization initiator selected from the group consisting of $C_1$–$C_8$-alkylhalides, $C_6$–$C_{15}$-aralkylhalides, $C_2$–$C_8$-haloalkyl esters, arene sulphonyl chlorides, haloalkanenitriles, α-haloacrylates and halolactones;

A and B represent polymer blocks which differ in polarity and contain repeating units of polymerizable, ethylenically unsaturated monomers selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters x and y are as defined in claim 1;

Z represents a polymer backbone which consists of repeating units of polymerizable, ethylenically unsaturated monomers selected from the group consisting of styrenes, acrylic acid, $C_1$–$C_4$-alkylacrylic acid, amides, anhydrides and salts of acrylic acid or $C_{1-C4}$-alkylacrylic acid, acrylic acid-$C_1$–$C_{24}$-alkyl esters and $C_1$–$C_4$-alkylacrylic acid-$C_{1-C24}$-alkyl esters, aminofunctional esters of acrylic acid or $C_1$–$C_4$-alkylacrylic acid acrylonitrile, methacrylonitrile, vinyl substituted heterocycles, styrene sulfonic acid and salts, vinylbenzoeic acid and salts, vinylformamide and amidosulphonic acid derivatives;

p represents a numeral from one to hundred; and q represents one.

5. A comb copolymer (I) according to claim 1, wherein

In represents fragment of a polymerization initiator which is selected from the group consisting of $C_1$–$C_8$-alkylhalides, $C_6$–$C_{15}$aralkylhalides, $C_2$–$C_8$-haloalkyl esters, arene sulphonyl chlorides, haloalkanenitriles, α-haloacrylates and halolactones;

A and B represent polymer blocks which differ in polarity and contain repeating units of polymerizable, ethylenically unsaturated monomers selected from the group consisting of 4-aminostyrene, di-$C_1$–$C_4$-alkylaminostyrene, styrene, acrylic acid $C_1$–$C_4$-alkylacrylic acid, acrylic or $C_1$–$C_4$-alkylacrylamides, acrylic or $C_1$–$C_4$-alkylacrylmono- or -di-$C_1$–$C_4$-alkylamides, acrylic or $C_1$–$C_4$-alkylacryl-di-$C_1$–$C_4$-alkyl-amino-$C_2$–$C_4$-alkylamides, acrylic or $C_1$–$C_4$-alkylacryl-amino-$C_2$–$C_4$alkylamides, anhydrides and salts of acrylic acid or $C_1$–$C_4$-alkylacrylic acid, acrylic or $C_1$–$C_4$-alkylacrylic acid-mono- or -di-$C_1$–$C_4$-alkylamino-$C_2$–$C_4$-alkyl esters, acrylic or $C_1$–$C_4$-alkylacrylic acid-hydroxy-$C_2$–$C_4$-alkyl esters, acrylic or $C_1$–$C_4$-alkylacrylic acid-($C_1$–$C_4$-alkyl)$_3$silyloxy-$C_2$–$C_4$-alkyl esters, acrylic or $C_1$–$C_4$-alkylacrylic acid-($C_1$–$C_4$-alkyl)$_3$silyl-$C_2$–$C_4$-alkyl esters, acrylic or $C_1$–$C_4$-alkylacrylic acid-heterocyclyl-$C_2$–$C_4$-alkyl esters, $C_1$–$C_{24}$-alkoxylated poly-$C_2$–$C_4$-alkylene glycol acrylic or $C_1$–$C_4$-alkylacrylic acid esters, acrylic acid-$C_1$–$C_{24}$-alkyl esters and $C_1$–$C_4$-alkylacrylic acid-$C_1$–$C_{24}$-alkyl esters;

x and y are as defined in claim 1;

Z represents a polymer backbone which consists of repeating units from polymerizable ethylenically unsaturated monomers selected from the group consisting of 4-aminostyrene and salts thereof, di-$C_1$–$C_4$-alkylaminostyrene and salts thereof, acrylic or $C_1$–$C_4$-alkylacrylic acid or anhydrides and salts thereof, acrylic or $C_1$–$C_4$-alkylacrylic acid-mono- or -di-$C_1$–$C_4$-alkylamino-$C_2$–$C_4$-alkyl esters and salts thereof, acrylic or $C_1$–$C_4$-alkylacrylic acid-hydroxy-$C_2$–$C_4$-alkyl esters, acrylic or $C_1$–$C_4$-alkylacrylic acid-($C_1$–$C_4$-alkyl)$_3$silyloxy-$C_2$–$C_4$-alkyl esters, acrylic or $C_1$–$C_4$-alkylacrylic acid-($C_1$–$C_4$-alkyl)$_3$silyl-$C_2$–$C_4$-alkyl esters, acrylic or $C_1$–$C_4$-alkylacrylic acid-heterocyclyl-$C_2$–$C_4$-alkyl esters and salts thereof, $C_1$–$C_{24}$-alkoxylated poly-$C_2$–$C_4$-alkylene glycol acrylic or $C_1$–$C_4$-alkylacrylic acid esters, acrylic or $C_1$–$C_4$-alkylacrylamides, acrylic or $C_1$–$C_4$-alkylacrylmono- or -di-$C_1$–$C_4$-alkylamides, acrylic or $C_1$–$C_4$-alkylacryl-di-$C_1$–$C_4$-alkylamino$C_2$–$C_4$-alkylamides and salts thereof, acrylic or $C_1$–$C_4$-alkylacryl-amino-$C_2$–$C_4$alkylamides, acrylonitrile, methacrylonitrile, 4-aminostyrene and salts thereof, di-$C_1$–$C_4$-alkylaminostyrene and salts thereof, vinyl substituted heterocycles, styrene sulfonic acid and salts, vinylbenzoeic acid and salts, vinylformamide and amidosulphonic acid derivatives;

p represents a numeral from one to hundred; and q represents one.

6. A comb copolymer (I) according to claim 1, wherein

In represents the fragment of a polymerization Initiator which is selected from the group consisting of $C_1$–$C_8$-alkyl halides, $C_6$–$C_{15}$-aralkylhalides, $C_2$–$C_8$-haloalkyl esters, arene sulphonyl chlorides, haloalkanenitriles, α-haloacrylates and halolactones;

A and B represent polymer blocks containing repeating units of polymerizable, ethylenically unsaturated monomers selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters;

x and y are as defined in claim 1;

Z represents a polymer block which consists of repeating units from polymerizable ethylenically unsaturated monomers selected from the group consisting of acrylic or $C_1$–$C_4$-alkylacrylic acid or anhydrides and salts thereof, acrylic or $C_1$–$C_4$-alkylacrylic acid-mono- or -di-$C_1$–$C_4$-alkylamino-$C_2$–$C_4$-alkyl esters and salts thereof, acrylic or $C_1$–$C_4$-alkylacrylic acid-hydroxy-$C_2$–$C_4$-alkyl esters, acrylic or $C_1$–$C_4$-alkylacrylic acid-($C_1$–$C_4$-alkyl)$_3$silyloxy-$C_2$–$C_4$-alkyl esters, acrylic or $C_1$–$C_4$-alkylacrylic acid-($C_1$–$C_4$-alkyl)$_3$silyl-$C_2$–$C_4$-alkyl esters, acrylic or $C_1$–$C_4$-alkylacrylic acid-heterocyclyl-$C_2$–$C_4$-alkyl esters and salts thereof, $C_1$–$C_{24}$-alkoxylated poly-$C_2$–$C_4$-alkylene glycol acrylic or $C_1$–$C_4$-alkylacrylic acid esters, acrylic or $C_1$–$C_4$-alkylacrylamides, acrylic or $C_1$–$C_4$-alkylacrylmono- or -di-$C_1$–$C_4$-alkylamides, acrylic or $C_1$–$C_4$-alkylacryl-di-$C_1$–$C_4$-alkylamino$C_2$–$C_4$-alkylamides and salts thereof, acrylic or $C_1$–$C_4$-alkylacryl-amino-$C_2$–$C_4$alkylamides, acrylonitrile, methacrylonitrile, 4-aminostyrene and salts thereof, di-$C_1$–$C_4$-alkylaminostyrene and salts thereof, vinyl substituted heterocycles, styrene sulfonic acid and salts, vinylbenzoeic acid and salts, vinylformamide and amidosulphonic acid derivatives; and p represents a numeral from one to hundred; and q represents one.

7. A composition comprising a) 0.1–99.9% by weight of a comb copolymer (I) according to claim 1; and b) 0.1–99.9% by weight of dispersible inorganic or organic pigment particles.

8. A composition according to claim 7, wherein the dispersible organic pigment particles of the component b) are selected from the azo pigment group consisting of azo, disazo, napthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketoypyrrolopyrrole, and carbazoles, pigments and pearlescent flakes.

9. A composition according to claim 7 wherein the dispersible inorganic pigment particles of the component b) are selected from the group consisting of aluminium, aluminium oxide, silicon oxide and silicates, iron(III)oxide, chromium (III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, chromates, and molybdates, and mixtures, crystal forms or modifications thereof.

10. A composition according to claim 7 which additionally contains binding agents and conventional additives selected from the group consisting of surfactants, stabilizers, anti-foaming agents, dyes, plasticizers, thixotropic agents, drying catalysts, anti-skinning agents and leveling agents.

11. A pigment dispersion comprising a composition according to claim 7 and a liquid carrier selected from the group consisting of water, organic solvents and mixtures thereof.

12. A composition comprising
   a') a comb copolymer (I) according to claim 1; and
   b') a polymeric binder selected from aqueous emulsion and aqueous dispersion polymers.

13. A composition according to claim 12, wherein the polymeric binder is selected from the group consisting of polyacrylates, styrene/acrylate copolymers, ethylene/vinylacetate copolymers, polyvinylchloride and copolymers thereof, polyesters, alkyd polymers, polyurethanes and epoxypolymers.

14. A macromonomer of the formula

$$\text{In-}[(A_x\text{-}B_y)\text{-}X]_q \qquad (II),$$

wherein
   In represents the fragment of a polymerization initiator capable of initiating polymerization of ethylenically unsaturated monomers in the presence of a catalyst which activates controlled radical polymerization;
   A represents an oligopolymer or polymer fragment which consists of ethylenically unsaturated repeating units of polymerizable monomers or oligopolymers;
   x represents a numeral greater than one and defines the number of repeating units in A;
   B represents a monomer, oligopolymer or polymer fragment copolymerized with A;
   y represents zero or a numeral greater than zero and defines the number of monomer, oligopolymer or polymer repeating units in B;
   X represents a polymerizable, ethylenically unsaturated monomer unit; and
   q represents one or a numeral greater than one and defines the number of groups of the partial formula $$\text{-}(A_x\text{-}B_y)\text{-}X \qquad (B')$$

per initiator fragment In.

15. A macromonomer (II) according to claim 14, wherein
   In represents the fragment of a polymerization initiator which is selected from the group consisting of $C_1$–$C_8$-alkylhalides, $C_6$–$C_{15}$-aralkylhalides, $C_2$–$C_8$-haloalkyl esters, arene sulphonyl chlorides, haloalkanenitriles, α-haloacrylates and halolactones;
   A and B represent polymer blocks which differ in polarity and contain repeating units of polymerizable, ethylenically unsaturated monomers selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1C_{24}$-alkyl esters and $C_1$–$C_4$-alkylacrylic acid-$C_1$–$C_{24}$-alkyl esters;
   X represents a polymerizable, ethylenically unsaturated monomer unit X selected from the group consisting of styrenes, acrylic acid, $C_1$–$C_4$-alkylacrylic acid, amides, anhydrides and salts of acrylic acid or $C_1$–$C_4$-alkylacrylic acid, acrylic acid-$C_1$–$C_{24}$-alkyl esters and $C_1$–$C_4$-alkylacrylic acid-$C_1$–$C_{24}$-alkyl esters, acrylonitrile, methacrylonitrile, vinyl substituted heterocycles, styrene sulfonic acid and salts, vinylbenzoeic acid and salts, vinylformamide and amidosulphonic acid derivatives; and
   q represents a numeral from one to four.

16. A composition comprising
   a) the macromonomer (II) according to claim 14; and
   b) at least one curing agent.

17. A process for the preparation of a macromonomer (II) wherein In, A, B, x, y, X and q are as defined in claim 14, which comprises polymerising by atom transfer radical polymerization (ATRP) in the presence of catalytically effective amount of an oxidisable transition metal complex catalyst, an aliphatic monomer or oligomer containing ethylene groups in the presence of a polymerization initiator

$$\text{In}\text{—}Y_{q'} \qquad (III),$$

wherein In represents the fragment of a polymerization initiator capable of initiating polymerization of monomers or oligopolymers containing ethylene groups, —Y represents a radically transferable atom or group and q' represents one or a numeral greater than one, and replacing —Y in a polymerisate of the formula

$$\text{In-}[(A_x\text{-}B_y)\text{-}Y]_q \qquad (IV)$$

with the polymerizable, ethylenically unsaturated monomer unit —X.

18. A process for the preparation of a comb copolymer of the formula (I) according to claim 1, which comprises polymerising a macromonomer of the formula

$$\text{In-}[(A_x\text{-}B_y)\text{-}X]_q \qquad (II),$$

wherein
   In represents the fragment of a polymerization initiator capable of initiating polymerization of ethylenically unsaturated monomers in the presence of a catalyst which activates controlled radical polymerization;
   A represents an oligopolymer or polymer fragment which consists of ethylenically unsaturated repeating units of polymerizable monomers or oligopolymers;
   x represents a numeral greater than one and defines the number of repeating units in A;
   B represents a monomer, oligopolymer or polymer fragment copolymerized with A;
   y represents zero or a numeral greater than zero and defines the number of monomer, oligopolymer or polymer repeating units in B;
   X represents a polymerizable, ethylenically unsaturated monomer unit; and
   q represents one or a numeral greater than one and defines the number of groups of the partial formula

$$\text{-}(A_x\text{-}B_y)\text{-}X \qquad (B')$$

per initiator fragment In, with different amounts of polymerizable ethylenically unsaturated monomers.

* * * * *